United States Patent [19]
Bowen et al.

[11] Patent Number: 5,950,453
[45] Date of Patent: Sep. 14, 1999

[54] MULTI-COMPONENT REFRIGERATION PROCESS FOR LIQUEFACTION OF NATURAL GAS

[75] Inventors: Ronald R. Bowen, Magnolia; Eric T. Cole, Kingwood; Edward L. Kimble, Sugar Land; Eugene R. Thomas; Lonny R. Kelley, both of Houston, all of Tex.

[73] Assignee: Exxon Production Research Company, Houston, Tex.

[21] Appl. No.: 09/099,262

[22] Filed: Jun. 18, 1998

Related U.S. Application Data

[60] Provisional application No. 60/050,280, Jun. 20, 1997, and provisional application No. 60/079,782, Mar. 27, 1998.

[51] Int. Cl.[6] ........................................ F25J 3/00
[52] U.S. Cl. .................................. 62/612; 62/613; 62/623
[58] Field of Search .............................. 62/612, 613, 623

[56] References Cited

U.S. PATENT DOCUMENTS

| | | | |
|---|---|---|---|
| 3,298,805 | 1/1967 | Secord et al. | 48/190 |
| 3,477,509 | 11/1969 | Arendt | 166/252 |
| 3,593,535 | 7/1971 | Gaumer, Jr. et al. | |

(List continued on next page.)

OTHER PUBLICATIONS

Bennett, C. P. Marine Transportation of LNG at Intermediate Temperature, *CME* (Mar. 1979), pp. 63–64.

Broeker, R. J. CNG and MLG–New Natural Gas Transportation Processes, *American Gas Journal* (Jul. 1969) pp. 138–140.

Domain, L. LNG–Dreams and Prospects, *World Petroleum* (Apr. 1967), pp. 300–304.

Faridany, E. K., Ffooks R. C., and Meikle, R. B. A Pressure LNG System, *European Offshore Petroleum Conference & Exhibition* (Oct. 21–24, 1980), vol. EUR 171, pp. 245–254.

Faridany, E. K., Secord, H. C., O'Brien, J. V., Pritchard, J. F., and Banister, M. The Ocean Phoenix Pressure–LNG System, pp. 267–280.

Fluggen, Prof. E. and Backhaus, Dr. I. H. Pressurised LNG—and the Utilisation of Small Gas Fields, *Gastech78, LNG/LPG Conference* (Nov. 7, 1978), Monte Carlo pp. 195–204.

LNG (MCR) and LNG(Tealarc), *Hydrocarbon Processing* (Apr. 1990), p. 85.

Jackson, R. G. Today's Processes for the Liquefaction of Natural Gas, *World Petroleum* (Sep. 1966), pp. 52–56.

Perret, J. Techniques in the Liquefaction of Natural Gas, *French Natural Gas*, (Nov. 11, 1996), pp. 1537–1539.

Petsinger, R. E. LNG on the Move, *Gas*, (Dec. 1967), pp. 45–59.

Price, B.C., Zey, A. F., and Ryan, J. M. Sour Gas Processing for Gas Sales and LNG Production, *Society of Petroleum Engineers 1996 International Meeting on Petroleum Engineering* (Mar. 17–20, 1986), Beijing China, Paper No. SPE 14057, pp. 145–155.

Broeker, R. J. A New Process for the Transportation of Natural Gas, *Proceedings of the First International Conference on LNG* (1968), Chicago, Illinois, Session No. 5, Paper 30, pp. 1–11.

*Primary Examiner*—Christopher B. Kilner
*Attorney, Agent, or Firm*—G. D. Lawson

[57] ABSTRACT

This invention relates to a process for liquefying a pressurized gas stream rich in methane in which the liquefication of the gas stream occurs in a heat exchanger being cooled by a closed-loop multi-component refrigeration system to produce a methane-rich liquid product having a temperature above about −112° C. (−170° F.) and a pressure sufficient for the liquid product to be at or below its bubble point. The liquefied gas product is then introduced to a storage means at a temperature above about −112° C. (−170° F.).

21 Claims, 9 Drawing Sheets

U.S. PATENT DOCUMENTS

| | | | |
|---|---|---|---|
| 3,747,359 | 7/1973 | Streich . | |
| 3,857,245 | 12/1974 | Jones | 60/651 |
| 3,877,240 | 4/1975 | Kniel et al. . | |
| 3,919,852 | 11/1975 | Jones | 62/7 |
| 3,964,891 | 6/1976 | Krieger . | |
| 3,970,441 | 7/1976 | Etzbach et al. . | |
| 4,112,700 | 9/1978 | Förg . | |
| 4,274,849 | 6/1981 | Garier et al. . | |
| 4,303,427 | 12/1981 | Krieger . | |
| 4,315,407 | 2/1982 | Creed et al. . | |
| 4,339,253 | 7/1982 | Caetani et al. . | |
| 4,437,312 | 3/1984 | Newton et al. | 60/648 |
| 4,525,185 | 6/1985 | Newton . | |
| 4,548,629 | 10/1985 | Chiu . | |
| 4,755,200 | 7/1988 | Liu et al. . | |
| 4,901,533 | 2/1990 | Fan et al. . | |
| 5,036,671 | 8/1991 | Nelson et al. . | |
| 5,157,925 | 10/1992 | Denton et al. . | |
| 5,199,266 | 4/1993 | Johansen . | |
| 5,363,655 | 11/1994 | Kikkawa et al. . | |
| 5,365,740 | 11/1994 | Kikkawa et al. . | |
| 5,502,972 | 4/1996 | Howard et al. . | |
| 5,651,269 | 7/1997 | Prevost et al. | 62/613 |
| 5,657,643 | 8/1997 | Price | 62/612 |
| 5,701,761 | 12/1997 | Prevost et al. | 62/613 |
| 5,718,126 | 2/1998 | Capron et al. | 62/613 |
| 5,791,160 | 8/1998 | Mandler et al. | 62/611 |

MULTI-COMPONENT REFRIGERATION PROCESS FOR LIQUEFACTION OF NATURAL GAS

This application claims the benefit of (i) U.S. Provisional Application No. 60/050,280, filed Jun. 20, 1997; and U.S. Provisional Application No. 60/079,782 filed Mar. 27, 1998.

FIELD OF THE INVENTION

This invention relates to a natural gas liquefaction process, and more particularly relates to a process to produce pressurized liquid natural gas (PLNG).

BACKGROUND OF THE INVENTION

Because of its clean burning qualities and convenience, natural gas has become widely used in recent years. Many sources of natural gas are located in remote areas, great distances from any commercial markets for the gas. Sometimes a pipeline is available for transporting produced natural gas to a commercial market. When pipeline transportation is not feasible, produced natural gas is often processed into liquefied natural gas (which is called "LNG") for transport to market.

One of the distinguishing features of a LNG plant is the large capital investment required for the plant. The equipment used to liquefy natural gas is generally quite expensive. The liquefaction plant is made up of several basic systems, including gas treatment to remove impurities, liquefaction, refrigeration, power facilities, and storage and ship loading facilities. While the cost of LNG plant can vary widely depending upon plant location, a typical conventional LNG project can cost from U.S. $5 billion to U.S. $10 billion, including field development costs. The plant's refrigeration systems can account for up to 30 percent of the cost.

In the design of a LNG plant, three of the most important considerations are (1) the selection of the liquefaction cycle, (2) the materials used in the containers, piping, and other equipment, and (3) the process steps for converting a natural gas feed stream into LNG.

LNG refrigeration systems are expensive because so much refrigeration is needed to liquefy natural gas. A typical natural gas stream enters a LNG plant at pressures from about 4,830 kPa (700 psia) to about 7,600 kPa (1,100 psia) and temperatures from about 20° C. (68° F.) to about 40° C. (104° F.). Natural gas, which is predominantly methane, cannot be liquefied by simply increasing the pressure, as is the case with heavier hydrocarbons used for energy purposes. The critical temperature of methane is -82.5° C. (-116.5° F.). This means that methane can only be liquefied below that temperature regardless of the pressure applied. Since natural gas is a mixture of gases, it liquefies over a range of temperatures. The critical temperature of natural gas is typically between about -85° C. (-121° F.) and -62° C. (-80° F.). Typically, natural gas compositions at atmospheric pressure will liquefy in the temperature range between about -165° C. (-265° F.) and -155° C. (-247° F.). Since refrigeration equipment represents such a significant part of the LNG facility cost, considerable effort has been made to reduce refrigeration costs.

Although many refrigeration cycles have been used to liquefy natural gas, the three types most commonly used in LNG plants today are: (1) "cascade cycle" which uses multiple single component refrigerants in heat exchangers arranged progressively to reduce the temperature of the gas to a liquefaction temperature, (2) "expander cycle" which expands gas from a high pressure to a low pressure with a corresponding reduction in temperature, and (3) "multi-component refrigeration cycle" which uses a multi-component refrigerant in specially designed exchangers. Most natural gas liquefaction cycles use variations or combinations of these three basic types.

A mixed refrigerant system involves the circulation of a multi-component refrigeration stream, usually after precooling to about -35° C. (-31° F.) with propane. A typical multi-component system will comprise methane, ethane, propane, and optionally other light components. Without propane precooling, heavier components such as butanes and pentanes may be included in the multi-component refrigerant. The nature of the mixed refrigerant cycle is such that the heat exchangers in the process must routinely handle the flow of a two-phase refrigerant. This requires the use of large specialized heat exchangers. Mixed refrigerants exhibit the desirable property of condensing over a range of temperatures, which allows the design of heat exchange systems that can be thermodynamically more efficient than pure component refrigerant systems. Examples of multi-component refrigeration processes are disclosed in U.S. Pat. Nos. 5,502,972; 5,497,626; 3,763,638; and 4,586,942.

Materials used in conventional LNG plants also contributes to the plants's cost. Containers, piping, and other equipment used in LNG plants are typically constructed, at least in part, from aluminum, stainless steel or high nickel content steel to provide the necessary strength and fracture toughness at low temperatures.

In conventional LNG plants water, carbon dioxide, sulfur-containing compounds, such as hydrogen sulfide and other acid gases, n-pentane and heavier hydrocarbons, including benzene, must be substantially removed from the natural gas processing, down to parts-per-million (ppm) levels. Some of these compounds will freeze, causing plugging problems in the process equipment. Other compounds, such as those containing sulfur, are typically removed to meet sales specifications. In a conventional LNG plant, gas-treating equipment is required to remove the carbon dioxide and acid gases. The gas treating equipment typically uses a chemical and/or physical solvent regenerative process and requires a significant capital investment. Also, the operating expenses are high. Dry bed dehydrators, such as molecular sieves, are required to remove the water vapor. A scrub column and fractionation equipment are typically used to remove the hydrocarbons that tend to cause plugging problems. Mercury is also removed in a conventional LNG plant since it can cause failures in equipment constructed of aluminum. In addition, a large portion of the nitrogen that may be present in natural gas is removed after processing since nitrogen will not remain in the liquid phase during transport of conventional LNG and having nitrogen vapors in LNG containers at the point of delivery is undesirable.

There is still a need in the industry for an improved process for liquefying natural gas which minimizes the amount of refrigeration equipment and process power required.

SUMMARY

This invention relates to an improved process for liquefying a feed gas stream rich in methane. The feed gas stream has a pressure above about 3,100 kPa (450 psia). If the pressure is too low, the gas may be first compressed. The gas is liquefied by a multi-component refrigeration system to produce a liquid product having a temperature above about -112° C. (-170° F.) and a pressure sufficient for the liquid product to be at or below its bubble point temperature, a product referred to herein as pressurized liquid natural gas ("PLNG"). Prior to liquefaction by multi-component refrigeration, the gas is preferably cooled by recycle vapors that pass through the expansion means without being liquefied. The PLNG is introduced to a storage means for storage at a temperature above about −112° C. (−170° F.).

In another embodiment of the invention, if the feed gas contains components heavier than methane, the predominant portion of the heavier hydrocarbons are removed by a fractionation process prior to the liquefaction by multi-component refrigeration.

In still another embodiment of this invention, a boil-off gas resulting from evaporation of liquefied natural gas can be added to the feed gas for liquefaction by the multi-component refrigeration to produce PLNG.

The method of the present invention can be used both for the initial liquefaction of a natural gas at the source of supply for storage or transportation, and to re-liquefy natural gas vapors given off during storage and ship loading. Accordingly, an object of this invention is to provide an improved liquefaction system for the liquefaction or reliquefaction of natural gas. Another object of this invention is to provide an improved liquefaction system wherein substantially less compression power is required than in prior art systems. A still further object of the invention is to provide an improved liquefaction process that is economical and efficient in operation. The very low temperature refrigeration of conventional LNG process is very expensive compared to the relatively mild refrigeration needed in the production of PLNG in accordance with the practice of this invention.

BRIEF DESCRIPTION OF THE DRAWINGS

The present invention and its advantages will be better understood by referring to the following detailed description and the attached FIGS. which are schematic flow diagrams of representative embodiments of this invention.

Figure 1:
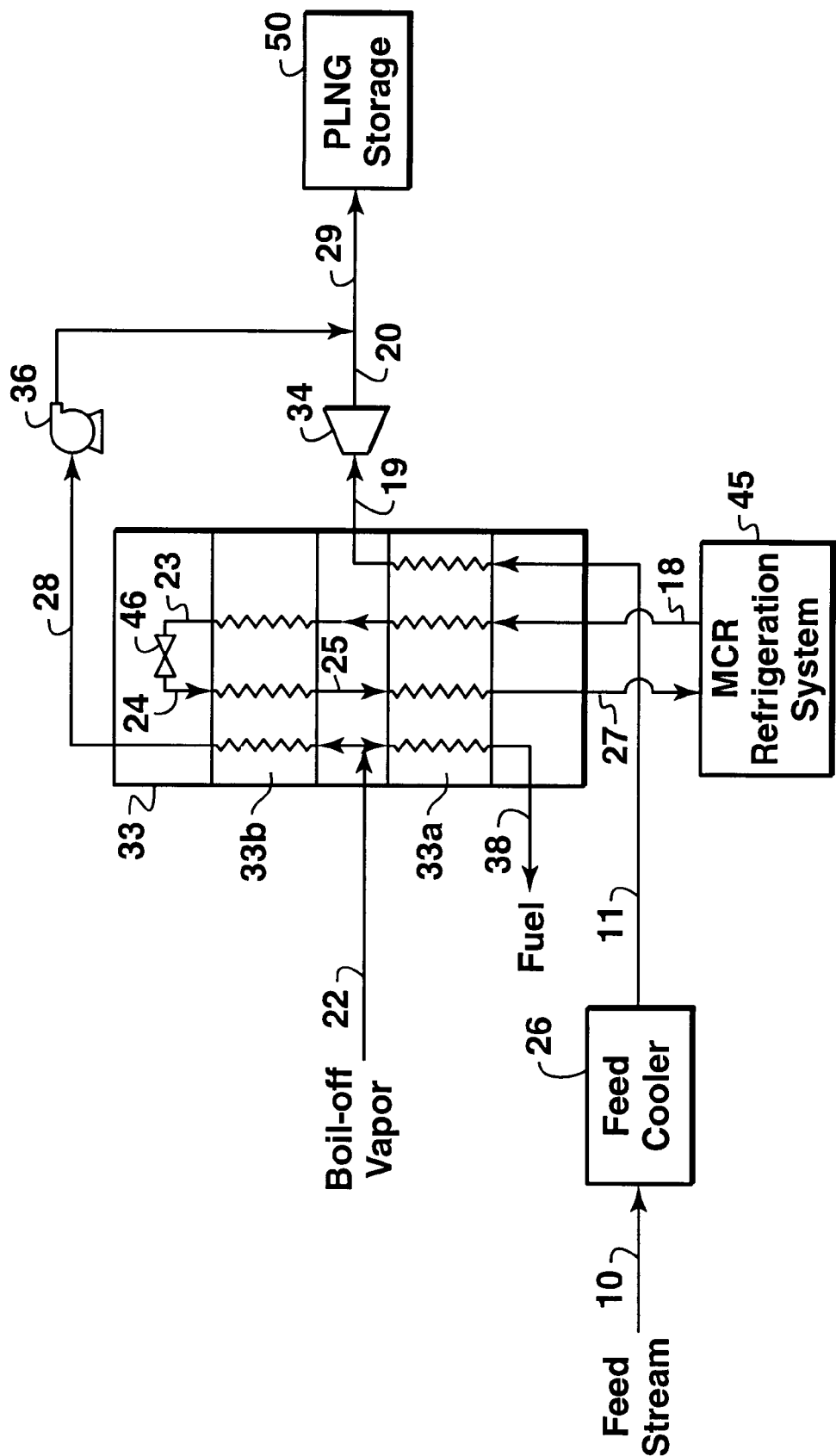
FIG. 1 is a schematic flow diagram of one embodiment of this invention showing a closed-loop multi-component refrigeration system to produce PLNG.

The flow diagrams illustrated in the Figures present various embodiments of practicing the process of this invention. The Figures are not intended to exclude from the scope of the invention other embodiments that are the result of normal and expected modifications of these specific embodiments. Various required subsystems such as pumps, valves, flow stream mixers, control systems, and sensors have been deleted from the Figures for the purposes of simplicity and clarity of presentation.

DESCRIPTION OF THE PREFERRED EMBODIMENTS

The present invention uses a multi-component refrigeration system to liquefy natural gas to produce a methane-rich liquid product having a temperature above about −112° C. (−170° F.) and a pressure sufficient for the liquid product to be at or below its bubble point. This methane-rich product is sometimes referred to in this description as pressurized liquid natural gas (PLNG). The term "bubble point" is the temperature and pressure at which a liquid begins to convert to gas. For example, if a certain volume of PLNG is held at constant pressure, but its temperature is increased, the temperature at which bubbles of gas begin to form in the PLNG is the bubble point. Similarly, if a certain volume of PLNG is held at constant temperature but the pressure is reduced, the pressure at which gas begins to form defines the bubble point. At the bubble point, the mixture is saturated liquid.

Using a multi-component refrigeration system in accordance with the present invention requires less power for liquefying the natural gas than multi-component processes used in the past and the equipment used in the process of this invention can be made of less expensive materials. By contrast, prior art processes that produce LNG at atmospheric pressures having temperatures as low as −160° C. (−256° F.) require that at least part of the process equipment be made of expensive materials for safe operation.

The energy needed for liquefying the natural gas in the practice of this invention is greatly reduced over energy requirements of a conventional LNG plant. The reduction in necessary refrigeration energy required for the process of the present invention results in a large reduction in capital costs, proportionately lower operating expenses, and increased efficiency and reliability, thus greatly enhancing the economics of producing liquefied natural gas.

At the operating pressures and temperatures of the present invention, about 3½weight percent nickel steel can be used in piping and facilities in the coldest operating areas of the liquefaction process, whereas the more expensive 9 weight percent nickel or aluminum is generally required for the same equipment in a conventional LNG process. This provides another significant cost reduction for the process of this invention compared to prior art LNG processes.

The first consideration in cryogenic processing of natural gas is contamination. The raw natural gas feed stock suitable for the process of this invention may comprise natural gas obtained from a crude oil well (associated gas) or from a gas well (non-associated gas). The composition of natural gas can vary significantly. As used herein, a natural gas stream contains methane ($C_1$) as a major component. The natural gas will typically also contain ethane ($C_2$), higher hydrocarbons ($C_3+$), and minor amounts of contaminants such as water, carbon dioxide, hydrogen sulfide, nitrogen, butane, hydrocarbons of six or more carbon atoms, dirt, iron sulfide, wax, and crude oil. The solubilities of these contaminants vary with temperature, pressure, and composition. At cryogenic temperatures, $CO_2$, water, and other contaminants can form solids, which can plug flow passages in cryogenic heat exchangers. These potential difficulties can be avoided by removing such contaminants if conditions within their pure component, solid phase temperature-pressure phase boundaries are anticipated. In the following description of the invention, it is assumed that the natural gas stream has been suitably treated to remove sulfides and carbon dioxide and dried to remove water using conventional and well known processes to produce a "sweet, dry" natural gas stream. If the natural gas stream contains heavy hydrocarbons which could freeze out during liquefaction or if the heavy hydrocarbons are not desired in the PLNG, the heavy hydrocarbon may be removed by a fractionation process prior to producing the PLNG as described in more detail below.

One advantage of the present invention is that the warmer operating temperatures enables the natural gas to have higher concentration levels of freezable components than would be possible in a conventional LNG process. For example, in a conventional LNG plant that produces LNG at −160° C. (−256° F.) the $CO_2$ must be below about 50 ppm to avoid freezing problems. In contrast, by keeping the process temperatures above about −112° C. (−170° F.), the natural gas can contain $CO_2$ at levels as high as about 1.4 mole % $CO_2$ at temperatures of −112° C. (−170° F.) and about 4.2% at −95° C. (−139° F.) without causing freezing problems in the liquefaction process of this invention.

Additionally, moderate amounts of nitrogen in the natural gas need not be removed in the process of this invention because nitrogen will remain in the liquid phase with the liquefied hydrocarbons at the operating pressures and temperatures of the present invention. The ability to reduce, or in some cases omit, the equipment required for gas treating and nitrogen rejection provides significant technical and economic advantages. These and other advantages of the invention will be better understood by referring to the Figures.

Referring to FIG. 1, pressurized natural gas feed stream 10 preferably enters the liquefaction process at a pressure above about 1,724 kPa (250 psia) and more preferably above about 4827 kPa (700 psia) and preferably at temperatures below about 40° C. (104° F.); however, different pressures and temperatures can be used, if desired, and the system can be appropriately modified accordingly by persons skilled in the art taking into account the teachings of this invention. If the gas stream 10 is below about 1,724 kPa (250 psia), it can be pressurized by a suitable compression means (not shown), which may comprise one or more compressors.

The natural gas feed stream 10 is passed to a feed cooler 26, which can be any conventional cooling system that cools the natural gas stream to a temperature below about 30° C. (86° F.). The cooling is preferably effected by heat exchange with air or water. The cooled stream 11 exiting the feed cooler 26 is conveyed to a first cooling zone 33a of a conventional multi-component heat exchanger 33 that is commercially available and is familiar to those of ordinary skill in the art. This invention is not limited to any type of heat exchanger, but because of economics, plate-fin, spiral wound, and cold box heat exchangers are preferred. Preferably all streams containing both liquid and vapor phases that are sent to heat exchangers have both the liquid and vapor phases equally distributed across the cross section area of the passages they enter. To accomplish this, it is preferred to provide distribution apparati for individual vapor and liquid streams. Separators can be added to the multi-phase flow streams as required to divide the streams into liquid and vapor streams. For example, separators could be added to streams 18 and 24 of FIG. 1 (such separators are not shown in FIG. 1.) before the streams 18 and 24 enter cooling zones 33a and 33b, respectively.

Figure 9:
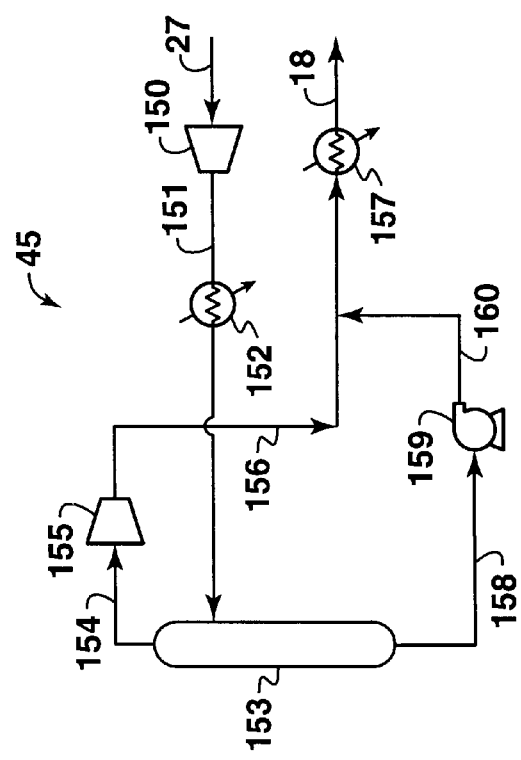
FIG. 9 is a schematic flow diagram of a preferred multi-component refrigeration system used in the embodiments illustrated in FIGS. 1, 2, 3, 4, and 6.

The heat exchanger 33 may have one or more cooling zones, preferably at least two. The heat exchanger 33 depicted in FIG. 1 has two cooling zones 33a and 33b. The natural gas in stream 11 is liquefied in cooling zone 33a by heat exchange with refrigerant from a multi-component refrigeration system 45, which is referred to in this description as MCR system 45. A preferred embodiment of a MCR system 45 is illustrated in FIG. 9, which is discussed in more detail below. The refrigerant in the MCR system is made up of a mixture of hydrocarbons, which may include for example methane, ethane, propane, butanes, and pentanes. A preferred refrigerant has the following composition on a mole percent basis: methane (25.8%), ethane (50.6%), propane (1.1%), i-butane (8.6%), n-butane (3.7%), i-pentane (9.0%), and n-pentane 1.2%). The concentration of the MCR components may be adjusted to match the cooling and condensing characteristics of the feed gas being refrigerated and the cryogenic temperature requirements of the liquefaction process. As an example of the temperature and pressure suitable for the closed-loop MCR refrigeration system, the multi-component refrigerant in line 27 at 345 kPa (50 psia) and 10° C. (50° F.) is directed to conventional compression and cooling in the MCR system 45 to produce a multi-component fluid stream 18 having a pressure of 1,207 kPa (175 psia) and a temperature of 13.3° C. (56° F.). Stream 18 is cooled in cooling zone 33a and further cooled in cooling zone 33b to produce a cold stream 23 exiting cooling zone 33b at a temperature of −99° C. (−146° F.). Stream 23 is then expanded across a conventional Joule-Thomson valve 46 to produce stream 24 at 414 kPa (60 psia) and −108° C. (−162° F.). Stream 24 is then warmed in cooling zone 33b and then further warmed in cooling zone 33a to produce stream 27 at 10° C. (50° F.) and 345 kPa (50 psia). The multi-component refrigerant is then recirculated in the closed-loop refrigeration system. In the liquefaction process illustrated in FIG. 1, the MCR system 45 is the only closed-loop refrigeration system used to produce PLNG.

Liquefied natural gas stream 19 is PLNG at a temperature above about −112° C. (−170° F.) and a pressure sufficient for the liquid product to be at or below its bubble point. If the pressure of stream 19 is higher than the pressure needed to keep stream 10 in a liquid phase, stream 19 may optionally be passed through one or more expansion means, such as a hydraulic turbine 34, to produce a PLNG product at a lower pressure but still having a temperature above about −112° C. (−170° F.) and a pressure sufficient for the liquid product to be at or below its bubble point. The PLNG is then sent by lines 20 and 29 to a suitable storage or transportation means 50 such as a pipeline, stationary storage tank, or a carrier such as a PLNG ship, truck, or railcar.

In the storage, transportation, and handling of liquefied natural gas, there can be a considerable amount of "boil-off," the vapors resulting from evaporation of a liquefied natural gas. This invention is particularly well suited for liquefying boil-off vapors produced by PLNG. The process of this invention can optionally re-liquefy such boil-off vapors. Referring to FIG. 1, boil-off vapor is introduced to the process of the invention through line 22. Optionally, a portion of stream 22 may be withdrawn and directed through cooling zone 33a to warm the withdrawn boil-off gas for later use as a fuel and to provide additional refrigeration to cooling zone 33a. The remaining portion of stream 22 is passed into cooling zone 33b where the boil-off gas is reliquefied. The liquefied natural gas exiting cooling zone 33b (stream 28) is pumped by pump 36 to the pressure of the PLNG exiting hydraulic turbine 34 and is then combined with stream 20 and sent to a suitable storage means 50.

The fluid streams exiting the hydraulic turbine 34 and pump 36 are preferably passed to one or more phase separators (such separators are not shown in the Figures) which separate the liquefied natural gas from any gas that was not liquefied in the process. The operation of such separators are well know to those of ordinary skill in the art. The liquefied gas is then passed to the PLNG storage means 50 and the gas phase from a phase separator may be used as fuel or recycled to the process for liquefaction.

Figure 2:
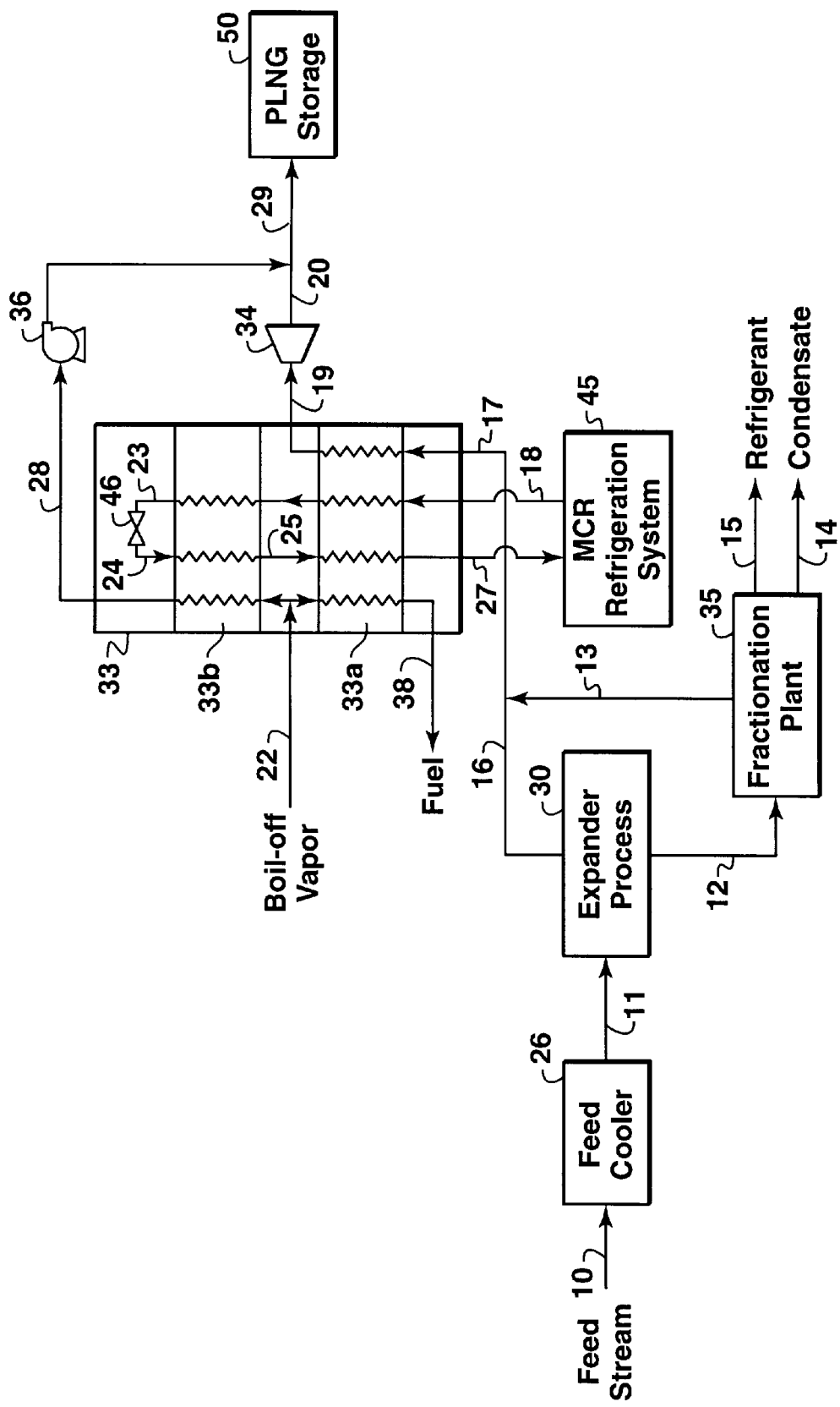
FIG. 2 is a schematic flow diagram of a second embodiment of this invention in which the natural gas is fractionated before liquefaction to PLNG.
Figure 8:
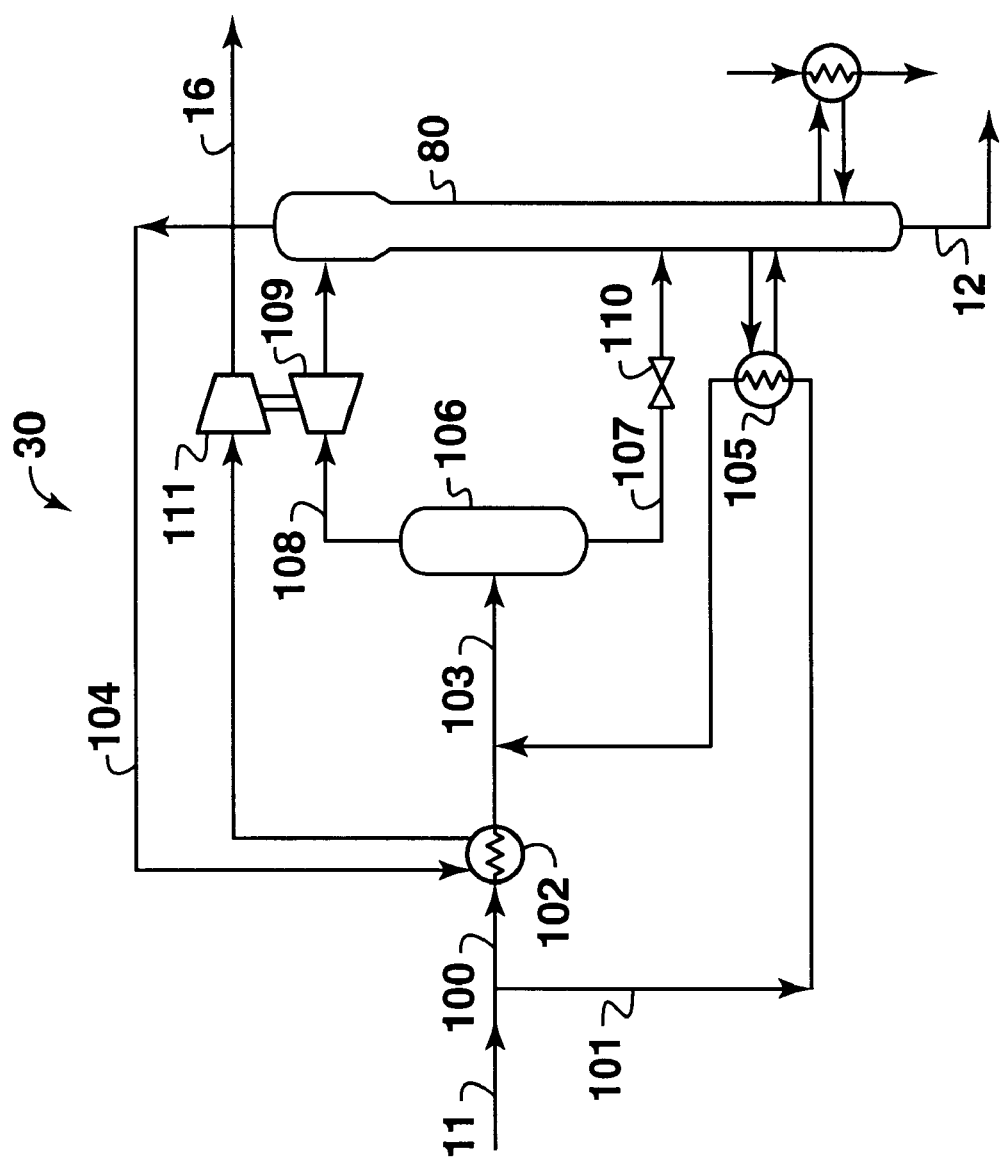
FIG. 8 is a schematic flow diagram of an expander process used in the embodiments illustrated in FIGS. 2, 5, 6, and 7.

FIG. 2 illustrates another embodiment of the invention and in this and the other Figures in this description with parts having like numerals have the same process functions. Those skilled in the art will recognize, however, that the process equipment from one embodiment to another may vary in size and capacity to handle different fluid flow rates, temperatures, and compositions. Referring to FIG. 2, a natural gas feed stream enters the system through line 10 and passes through a conventional feed cooler 26. The natural gas is passed from the feed cooler 26 to an expander process 30 which cools the natural gas stream to a temperature sufficient to condense at least a major portion of the heavier hydrocarbons constituents of the natural gas, which are called natural gas liquids (NGL). NGL includes ethane, propane, butane, pentane, isopentane, and the like. At the pressures ranging from 4,137 kPa (600 psia) to 7,585 kPa (1,100 psia), the temperatures required to effect the condensation range from about 0° C. (32° F.) to about −60° C. (−76° F.). A preferred embodiment of an expander process 30 is illustrated in FIG. 8, which is described in more detail below.

The bottoms stream 12 from the expander process 30 is passed to a conventional fractionation plant 35, the general operation of which is known to those skilled in the art. The fractionation plant 35 may comprise one or more fractionation columns (not shown in FIG. 2) which separate liquid bottom stream 12 into predetermined amounts of ethane, propane, butane, pentane, and hexane. The fractionation plant preferably comprises multiple fractionation columns (not shown) such as a deethanizer column that produces ethane, a depropanizer column that produces propane, and a debutanizer column that produces butane, all of which can be used as make-up refrigerants for the multi-component refrigeration system 45 or any other suitable refrigeration system. The refrigerant make-up streams are collectively illustrated in FIG. 2 by line 15. If feed stream 10 contains high concentrations of $CO_2$, one or more of the refrigerant make up streams 15 may need to be treated to remove $CO_2$ to avoid potential plugging problems in the refrigeration equipment. The fractionation plant 35 will preferably include a $CO_2$ removal process, if the $CO_2$ concentration in the refrigerant stream would otherwise exceed about 3 mole percent. Liquids are withdrawn from the fractionation plant 35 as condensate products, which are collectively depicted in the FIG. 2 as stream 14. The overhead streams from the fractionation columns of the fractionation plant 35 are rich in ethane and other light hydrocarbons, which are collectively shown in FIG. 2 as stream 13.

A methane-rich stream 16 from the demethanizer 30 is combined with the ethane-rich stream 13 and passed as stream 17 to mixed refrigerant cooling zone 33a to liquefy the natural gas. Refrigeration to cooling zone 33a is provided by a conventional multi-component refrigeration system 45, described in more detail above with regard to the description of the MCR system in FIG. 1. Although the MCR refrigerants circulate in a closed-loop system, if refrigerants are lost from the system through leaks, make up refrigerants can be obtained from the fractionation plant 35 (line 15). In the liquefaction process illustrated in FIG. 2, the multi-component refrigeration system 45 is the only closed-loop refrigeration system used to liquefy natural gas feed stream 10.

Liquefied natural gas stream 19 exiting the mixed refrigerant cooling zone 33a is passed through hydraulic turbine 34 to lower the fluid pressure to produce PLNG at a temperature above about −112° C. (−170° F.) and a pressure sufficient for the PLNG to be at or below its bubble point. The main advantage of this embodiment is that heavy hyrdrocarbon removal is possible in the expanded plant and refrigerants can be made up in the fractionation plant 35.

Figure 3:
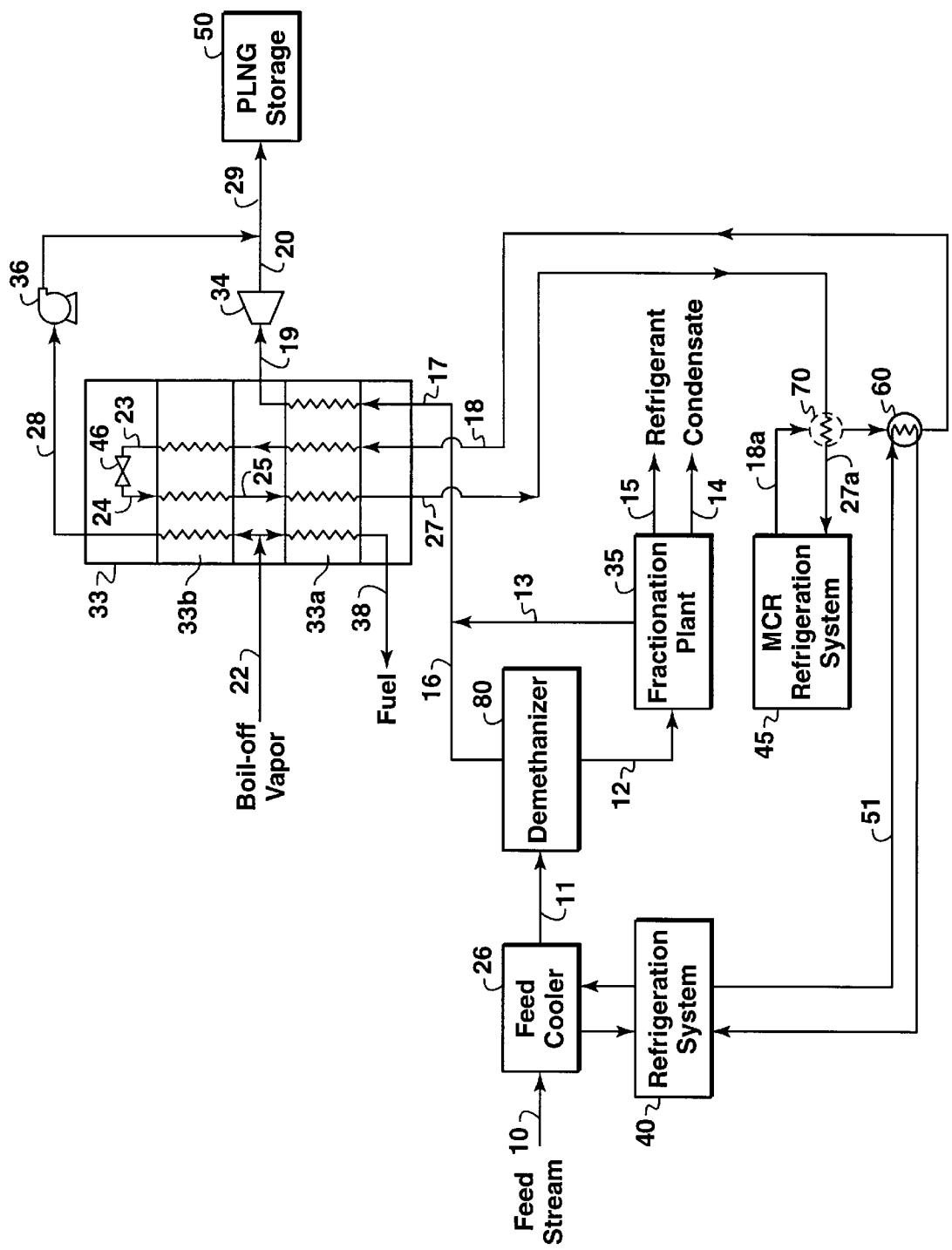
FIG. 3 is a schematic flow diagram of a third embodiment of this invention in which a closed-loop single component refrigeration system is used to precool the natural gas stream before liquefaction to PLNG.

FIG. 3 illustrates another embodiment of the present invention in which a closed-loop single-component refrigeration system is used to precool the natural gas stream 10 before liquefaction to PLNG. The process shown in FIG. 3 is similar to the process shown in FIG. 2 except that a closed-cycle refrigeration system 40 is used to provide at least part of the cooling for feed cooler 26 and to provide cooling to heat exchanger 60. Stream 11 exiting the feed cooler 26 is passed directly to a conventional demethanizer 80 without the need for an expander process 30 that is used in the process of FIG. 2. The refrigeration system 40 can be a conventional closed loop refrigeration system having propane, propylene, ethane, carbon dioxide, or any other suitable liquid as a refrigerant.

In FIG. 3, the liquid refrigerant in line 18a from the MCR system 45 may be optionally cooled in heat exchanger 70 by refrigerant in stream 27 which is returning to the MCR system 45 from the heat exchanger 33. Stream 18a may be further cooled in heat exchanger 60 by refrigerant from refrigeration system 40 which has a refrigerant flow stream 51 circulating between the refrigeration system 40 and heat exchanger 60. In this embodiment, a significant portion of the cooling requirements are moved to a conventional, pure-component, closed-loop refrigeration system 40, such as a propane system. Although additional heat exchangers are required, the size and cost of the heat exchanger 33 will be reduced.

Figure 4:
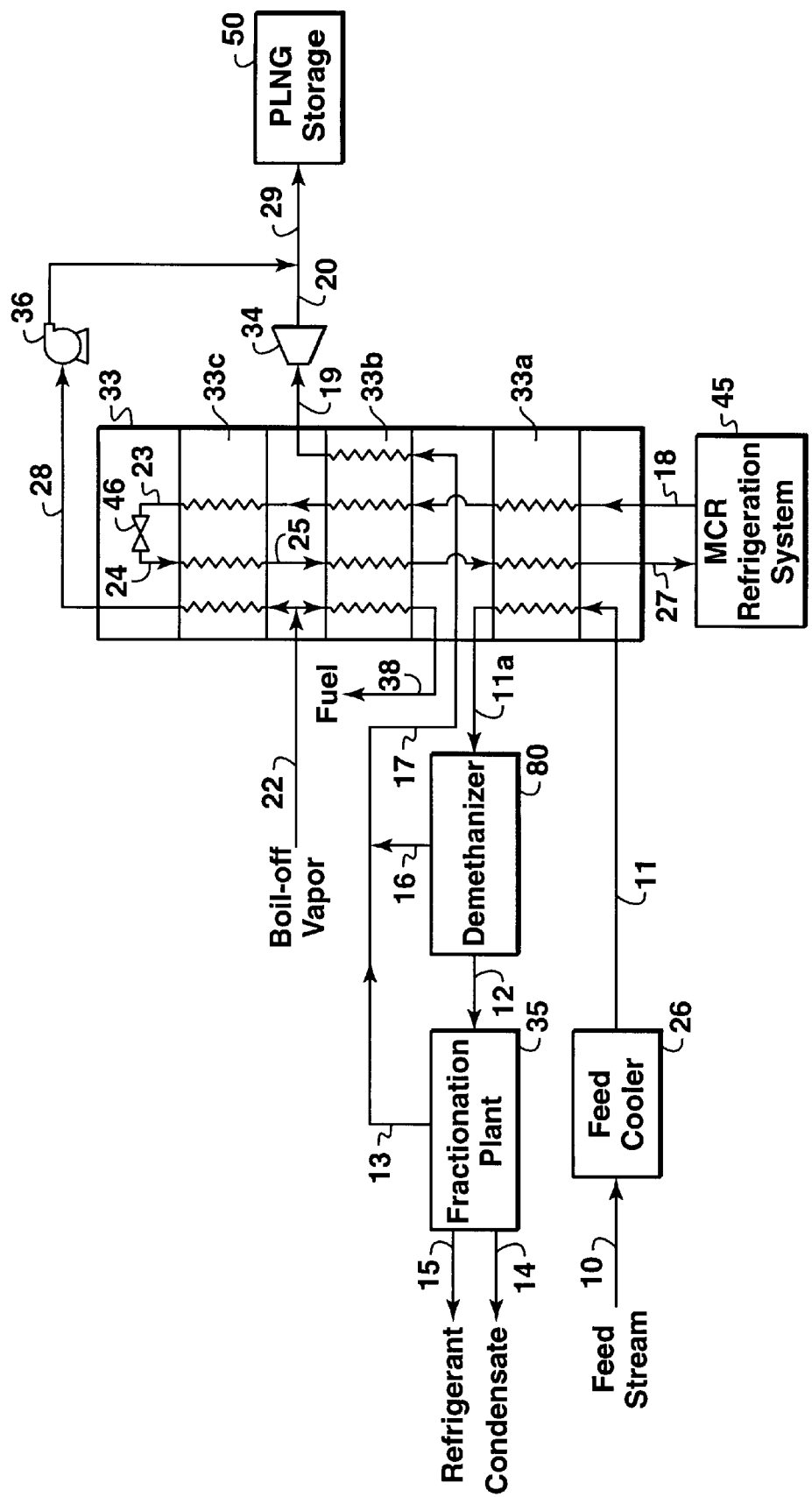
FIG. 4 is a schematic flow diagram of a fourth embodiment of this invention in which a closed-loop multi-component refrigeration system pre-cools a natural gas feed stream prior to fractionation and the refrigeration system also liquefies the natural gas feed stream to produce PLNG.

FIG. 4 illustrates another embodiment of the process of this invention in which a closed-loop multi-component refrigeration system 33 precools a natural gas feed stream prior to fractionation and the refrigeration system also liquefies the natural gas stream to produce PLNG. A natural gas feed stream enters the system through line 10 and is passed through a feed cooler 26 which cools and may partially liquefy the natural gas. The natural gas then passes through line 11 to a first cooling zone 33a of the multi-component heat exchanger 33. The heat exchanger 33 in this embodiment has three cooling zones (33a, 33b, 33c). The second cooling zone 33b is located between the first cooling zone 33a and the third cooling zone 33c and operates at a cooler temperature than the first cooling zone and at a warmer temperature than the third cooling zone.

The partially liquefied natural gas exits the first cooling zone 33a and passes through line 11a to a demethanizer 80. The demethanizer 80 fractionates the natural gas to produce a methane-rich overhead stream 16 and a bottom stream 12. Bottom stream 12 is passed to a fractionation plant 35 which is similar to the above the above description for FIG. 2.

The methane-enriched stream 16 from the demethanizer 30 and the overhead product stream 13 from the fractionation plant 35 are combined and passed as stream 17 to the second cooling zone 33b of the heat exchanger 33. Stream 19 exiting the second cooling zone 33b is passed through one or more expansion means such as a hydraulic turbine 34. Hydraulic turbine 34 produces a cold, expanded stream 20 (PLNG) which is passed to a storage means 50 at a temperature above about −112° C. (−170° F.) and a pressure sufficient for the liquid product to be at or below its bubble point.

Boil-off gas resulting from the evaporation of liquefied natural gas within a storage receptacle during transportation or loading operations may optionally be introduced by line 22 into the third cooling zone 33c in which the boil-off gas is reliquefied. Optionally, a portion of the boil-off gas may be passed through the second cooling zone 33b to heat the boil-off gas prior to its use as a fuel (stream 38). The liquefied natural gas exiting cooling zone 33c is pumped by pump 36 to the pressure of the PLNG in stream 20 and then and sent to storage means 50.

The FIG. 4 embodiment allows for heavy hydrocarbon removal and refrigerant make-up without significant pressure drop, such as is required in FIG. 2 embodiment, or an additional refrigeration system such as the FIG. 3 embodiment.

Figure 5:
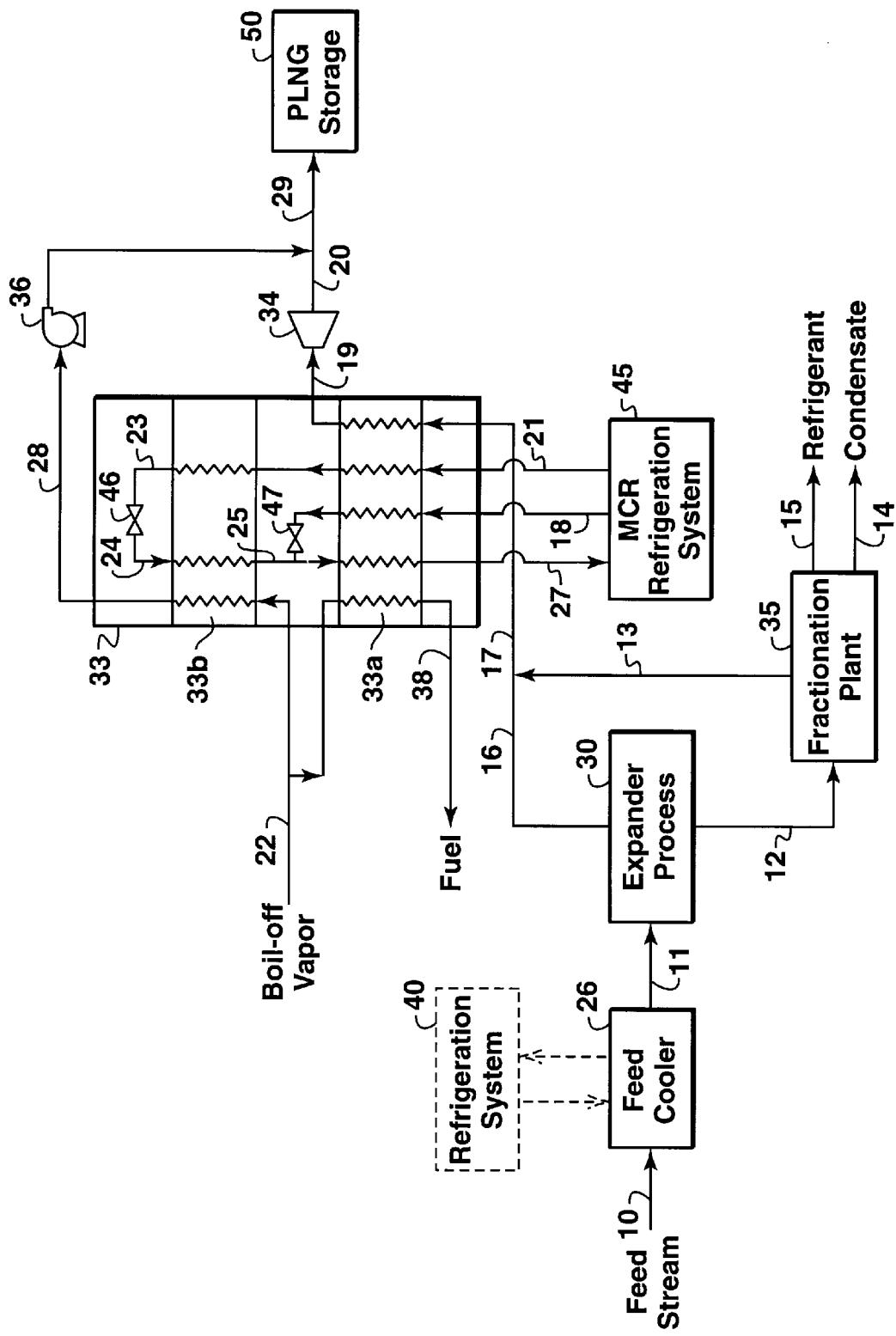
FIG. 5 is a schematic flow diagram of a fifth embodiment of this invention in which natural gas is fractionated and then is liquefied in a heat exchanger which is refrigerated by a second closed loop refrigeration system which uses both multi-component liquid and multi-component vapor as refrigerants. The boil-off vapor is reliquefied with only vapor of the multi-component refrigeration system.
Figure 10:
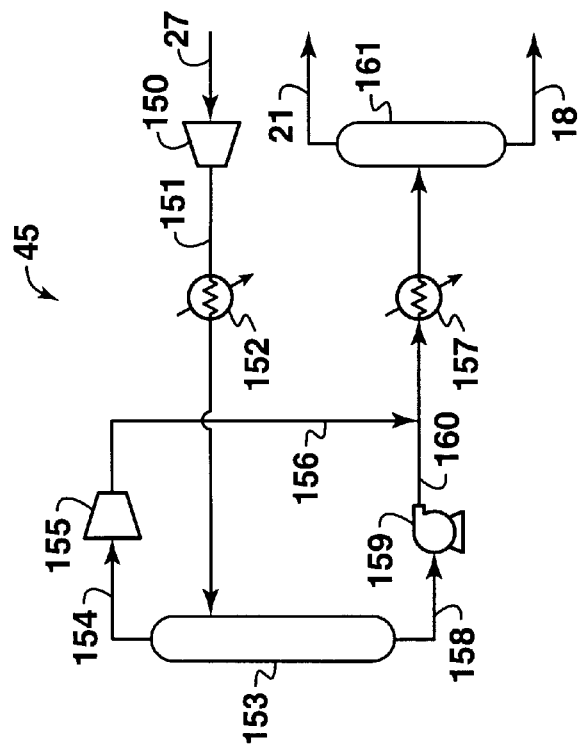
FIG. 10 is a schematic flow diagram of a preferred multi-component refrigeration system used in the embodiments illustrated in FIGS. 5 and 7.

FIG. 5 illustrates still another embodiment of this invention in which feed natural gas is cooled by a feed cooler 26 and the natural gas is liquefied in a heat exchanger 33 which is refrigerated by a closed-loop refrigeration system 45 which uses both multi-component liquid and multi-component vapor as refrigerants. This allows the liquefaction of the tank boil-off vapors with only the multi-component vapor. This embodiment is similar to the embodiment described in FIG. 2 except for operation of the multi-component heat exchanger system 33. A preferred embodiment of a MCR system 45 that uses both vapor and liquid refrigerants is illustrated in FIG. 10, which is discussed in more detail below.

Referring to FIG. 5, a natural gas feed stream enters the system through line 10 and is passed through a feed cooler 26 which comprises one or more heat exchangers that partially liquefy the natural gas. In this embodiment, the cooling is preferably effected by heat exchange with air or water. Feed cooler 26 is optionally refrigerated by a conventional closed-loop refrigeration system 40 wherein the cooling refrigerant is propane, propylene, ethane, carbon dioxide, or any other suitable refrigerant.

As an example of the temperature and pressure suitable for the closed-loop MCR system 45 depicted in FIG. 5, the multi-component refrigerant in line 27 at 345 kPa (50 psia) and 10° C. (50° F.) is directed to conventional compression and cooling in the MCR system 45 to produce a multi-component liquid stream 18 and a multi-component vapor stream 21, each of which has a pressure of 1207 kPa 175 psia) and a temperature of 13.3° C. (56° F.). Vapor stream 21 is further cooled in cooling zone 33a and still further cooled in cooling zone 33b to produce a cold stream 23 exiting cooling zone 33b at a temperature of −99° C. (−146° F.). Stream 23 is then expanded across a conventional Joule-Thomson valve 46 to produce stream 24 at 414 kPa (60 psia) and −108° C. (−162° F.). Stream 24 is then warmed in cooling zone 33b and then further warmed in cooling zone 33a to produce stream 27 at 10° C. (50° F.) and 345 kPa (50 psia). Stream 18 is cooled in cooling zone 33a and is then expanded across a conventional Joule-Thomson valve 47. The expanded fluid exiting expansion valve 47 is combined with stream 25 and recirculated. This embodiment has the advantage that the boil-off vapor is reliquefied using only the MCR vapor.

Figure 6:
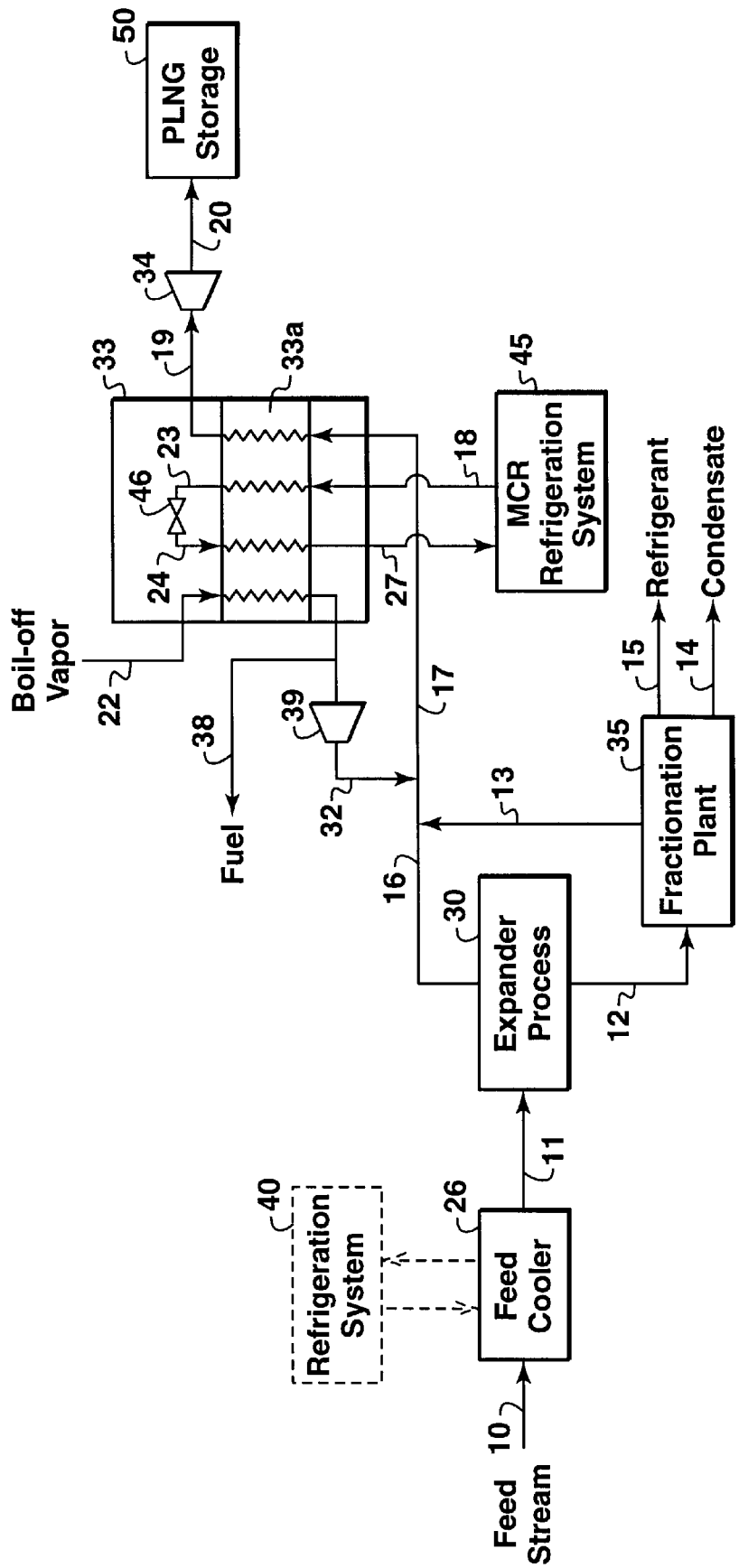
FIG. 6 is a schematic flow diagram of a sixth embodiment of this invention in which boil-off vapor and a natural gas feed are mixed prior to liquefaction by a milti-component refrigeration system to produce PLNG.

FIG. 6 illustrates still another embodiment of this invention which is similar to the embodiment illustrated in FIG. 2 except that the multi-component heat exchanger 33 has only one cooling zone (33a) and boil-off vapor is mixed with the natural gas streams 16 and 13 instead of being liquefied by a separate cooling zone of the heat exchanger 33. Boil-off vapor 22 is first passed through cooling zone 33a to provide cooling for warmer streams 17 and 18 that pass through heat exchanger 33a. After exiting the cooling zone 33a, part of stream 22 may optionally be withdrawn (stream 38) as fuel for providing power to the PLNG plant. The other portion of stream 22 is passed to a compressor 39 to pressurize the boil-off gas to approximately the pressure of gas in stream 17. The boil-off gas (stream 32) exiting compressor 39 is then combined with stream 17. This embodiment requires no mixing of cryogenic liquids and may be a simpler operation than the embodiment illustrated in FIG. 2.

Figure 7:
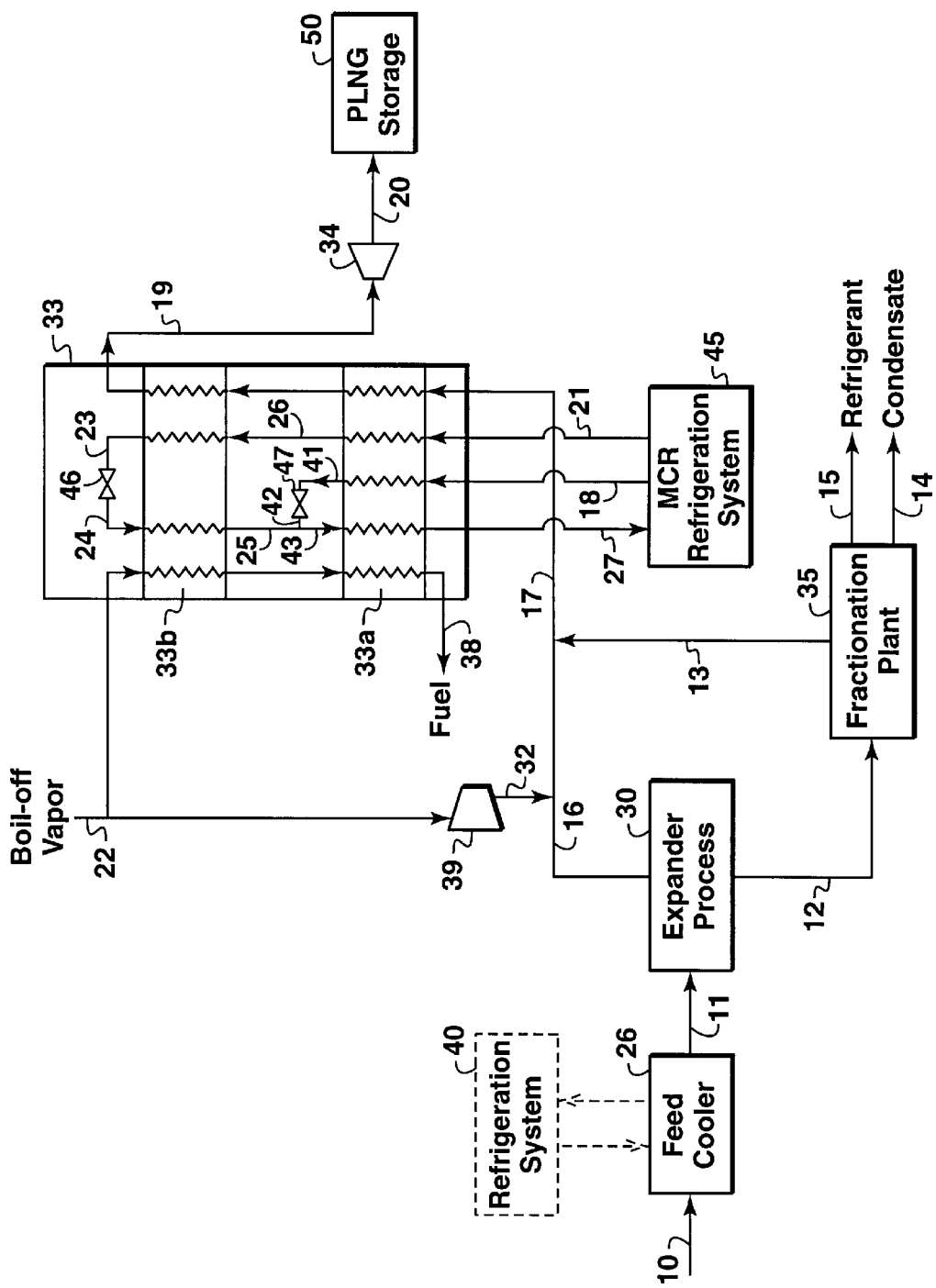
FIG. 7 is a schematic flow diagram of a seventh embodiment of this invention in which feed natural gas is fractionated and then liquefied in a heat exchanger which is refrigerated by a second closed loop refrigeration system which uses both multi-component liquid and multi-component vapor as refrigerants.

FIG. 7 illustrates still another embodiment of this invention in which feed gas is cooled by feed cooler 26 and the natural gas is liquefied in a multi-component heat exchanger 33 that is refrigerated by a closed-loop refrigeration system 45 which uses both multi-component liquid (stream 18) and multi-component vapor (stream 21) as refrigerant. The processing in this FIG. 7 is similar to the operation of the process illustrated in FIG. 5 except that at least part of the boil-off gas 22 is compressed by compressor 39 to approximately the pressure of the gas stream 16 and the compressed boil-off stream 32 is combined with natural gas stream 16. Stream 17, containing vapors from the expander process 30, vapors from the fractionation plant 35 and boil-off vapors from stream 32, is then passed through cooling zones 33a and 33b of heat exchanger 33 to liquefy gas stream 17 to produce PLNG (stream 19). Referring to FIG. 7, a portion of stream 22 is preferably withdrawn and passed through cooling zones 33b and 33a and exits heat exchanger 33 (stream 38) for use as fuel.

A preferred expander process 30 for use in the practice of the embodiments of FIGS. 2, 5, 6, and 7 is illustrated in FIG. 8. Referring to FIG. 8, gas stream 11 is divided into two separate streams 100 and 101. Gas stream 100 is cooled in heat exchanger 102 by cool residual gas in line 104. Gas stream 101 is cooled by side reboiler heat exchanger 105 through which demethanizer liquid flow from demethanizer column 130. Cooled streams 100 and 101 are recombined and the combined stream 103 is passed to a conventional phase separator 106. Separator 106 divides the stream 103 into liquid stream 107 and vapor stream 108. Vapor stream 108 is expanded to reduce its pressure such as by turboexpander 109. This expansion further cools the gas before it is fed into the upper region of the demethanizer column 80. The condensed liquid stream 107 is passed through a Joule-Thomson valve 110 to expand and further cool the liquid stream 107 before is passed to the demethanizer column 80.

Residual gas from the top of the demethanizer column 80 is conveyed to the heat exchanger 102 and passed through a compressor 111 which is powered at least in part by expander 109. The compressed, methane-rich stream 16 exiting the expander process 30 is further processed in accordance with the practice of this invention. The demethanizer produces a bottom liquid stream 12 which is predominantly natural gas liquids (NGL), primarily ethane, propane, butane, pentane, and heavier hydrocarbons. Additional examples of an expander process 30 suitable for use in the practice of this invention are described in U.S. Pat. No. 4,698,081 and in *Gas Conditioning and Processing*, Volume 3 of Advanced Techniques and Applications, John M. Campbell and Co., Tulsa, Oklahoma (1982).

FIG. 9 illustrates a schematic flow diagram of a preferred MCR system 45 for use in the embodiments illustrated in FIGS. 1, 2, 3, 4, and 6. Referring to FIG. 9, stream 27 enters a conventional compressor 150 to compress the refrigerant. From the compressor 150, a compressed stream 151 is cooled by passing through a conventional cooler 152, such as an air or water cooler, before stream 151 enters a conventional phase separator 153. Vapor from phase separator 153 is passed by stream 154 to a compressor 155. From the compressor 155 the compressed refrigerant vapor (stream 156) is cooled by a conventional cooler 157 to produce cooled refrigerant stream 18. A liquid stream 158 from the phase separator 152 is pumped by pump 159 to approximately the same pressure as the output pressure of compressor 155. The pressurized liquid from pump 159 (stream 160) is combined with stream 156 before being cooled by cooler 157.

FIG. 10 is a schematic flow diagram of the preferred MCR system 45 for use in the embodiments illustrated in FIGS. 5 and 7. The MCR system illustrated in FIG. 10 is similar to the MCR system 45 of FIG. 9 except that after liquid refrigerant stream 160 and vapor stream 156 are combined and cooled by cooler 157, the cooled stream from cooler 157 is passed to a conventional phase separator 161. Vapor exiting separator 161 becomes vapor stream 21 and liquid exiting separator 161 becomes liquid stream 18.

EXAMPLES

A simulated mass and energy balance was carried out to illustrate the embodiments illustrated in the Figures, and the results are set forth in Tables 1–7 below. The data presented in the Tables below are offered to provide a better understanding of the embodiments shown in FIGS. 1–7, but the invention is not to be construed as unnecessarily limited thereto. The temperatures and flow rates presented in the Tables are not to be considered as limitations upon the invention which can have many variations in temperatures and flow rates in view of the teachings herein. The Tables correspond to the Figures as follows: Table 1 corresponds to FIG. 1, Table 2 corresponds to FIG. 2, Table 3 corresponds to FIG. 3, Table 4 corresponds to FIG. 4, Table 5 corresponds to FIG. 5, Table 6 corresponds to FIG. 6, and Table 7 corresponds to FIG. 7.

The data were obtained using a commercially available process simulation program called HYSYS™, however, other commercially available process simulation programs can be used to develop the data, including for example HYSIM™, PROII™, and ASPEN PLUS™, all of which are familiar to those of ordinary skill in the art.

The data presented in Table 3 assumed that the embodiment shown in FIG. 3 had a propane refrigeration system 40 to cool the feed stream 10.

Using the basic process flow scheme shown in FIG. 3 and using the same feed stream composition and temperature, the required total installed power to produce conventional LNG (at near atmospheric pressure and a temperature of −160° C. (−256° F.) was more than twice the total installed power requirement to produce PLNG using the embodiment illustrated in FIG. 3: 185,680 kW (249,000 hp) to produce LNG versus 89,040 kW (119,400 hp) to produce PLNG. This comparison was performed using the HYSYS™ process simulator.

A person skilled in the art, particularly one having the benefit of the teachings of this patent, will recognize many modifications and variations to the specific processes disclosed above. For example, a variety of temperatures and pressures may be used in accordance with the invention, depending on the overall design of the system and the composition of the feed gas. Also, the feed gas cooling train may be supplemented or reconfigured depending on the overall design requirements to achieve optimum and efficient heat exchange requirements. As discussed above, the specifically disclosed embodiments and examples should not be used to limit or restrict the scope of the invention, which is to be determined by the claims below and their equivalents.

TABLE 1

| Stream | Phase Vapor/Liquid | Pressure kPa | Pressure psia | Temperature °C. | Temperature °F. | Flow Rate kgmole/hr | Flow Rate lbmole/hr | Composition, mole % $C_1$ | $C_2$ | $C_{3+}$ | $CO_2$ | $N_2$ |
|---|---|---|---|---|---|---|---|---|---|---|---|---|
| 10 | V | 5,571 | 808 | 21.1 | 70 | 7172 | 15,813 | 84.06 | 6.87 | 8.6 | 0.18 | 0.29 |
| 11 | V | 5,502 | 798 | 13.3 | 56 | 7172 | 15,813 | 84.06 | 6.87 | 8.6 | 0.18 | 0.29 |
| 18 | V/L | 2,068 | 300 | 13.3 | 56 | 9613 | 21,193 | 20 | 46 | 34 | 0 | 0 |
| 19 | L | 5,295 | 768 | −93.9 | −137 | 7172 | 15,813 | 84.06 | 6.87 | 8.6 | 0.18 | 0.29 |
| 20 | L | 2,586 | 375 | −95.6 | −140 | 7172 | 15,813 | 84.06 | 6.87 | 8.6 | 0.18 | 0.29 |
| 22 | V | 2,586 | 375 | −94.4 | −138 | 797 | 1,757 | 98 | 0.68 | 0.09 | 0.05 | 1.18 |
| 23 | L | 1,793 | 260 | −103.3 | −154 | 9613 | 21,193 | 20 | 46 | 34 | 0 | 0 |
| 24 | V/L | 414 | 60 | −106.1 | −159 | 9613 | 21,193 | 20 | 46 | 34 | 0 | 0 |
| 25 | V/L | 379 | 55 | −99.4 | −147 | 9613 | 21,193 | 20 | 46 | 34 | 0 | 0 |
| 27 | V | 345 | 50 | 11.1 | 52 | 9613 | 21,193 | 20 | 46 | 34 | 0 | 0 |
| 28 | L | 2,448 | 355 | −103.3 | −154 | 428 | 944 | 98 | 0.68 | 0.09 | 0.05 | 1.18 |
| 29 | L | 2,586 | 375 | −95.6 | −140 | 7620 | 16,891 | 84.85 | 6.52 | 8.11 | 0.18 | 0.34 |
| 38 | V | 2,517 | 365 | 11.1 | 52 | 384 | 846 | 98 | 0.68 | 0.09 | 0.05 | 1.18 |

TABLE 1-continued

|  | Power hp | Power kW |
|---|---:|---:|
| Compressors | | |
| Compressors of MCR Refrigeration System 45 | | |
| Stage 1 | 13,800 | 10,291 |
| Stage 2 | 4,700 | 3,505 |
| Expander | −270 | −201 |
| Expander 34 | | |
| Pumps | | |
| Pump 36 | 2 | 1 |
| Pump of MCR Refrigeration System 45 | 110 | 82 |
| Net Power | 18,300 | 13,647 |
| Total Installed | 18,900 | 14,094 |

TABLE 2

| Stream | Phase Vapor/Liquid | Pressure kPa | Pressure psia | Temperature °C | Temperature °F | Flow Rate kgmole/hr | Flow Rate lbmole/hr | $C_1$ | $C_2$ | $C_{3+}$ | $CO_2$ | $N_2$ |
|---|---|---:|---:|---:|---:|---:|---:|---:|---:|---:|---:|---:|
| 10 | V/L | 5,585 | 810 | 21.1 | 70 | 36,707 | 80,929 | 92.6 | 3.9 | 2.48 | 0.98 | 0.04 |
| 11 | V/L | 5,516 | 800 | 4.4 | 40 | 36,707 | 80,929 | 92.6 | 3.9 | 2.48 | 0.98 | 0.04 |
| 12 | L | 4,757 | 690 | 206.7 | 404 | 682 | 1,504 | 3.97 | 9.54 | 85.44 | 1.05 | 0 |
| 13 | V/L | 5,019 | 728 | 62.2 | 144 | 115 | 253 | 11.21 | 32.57 | 53.25 | 2.97 | 0 |
| 14 | L | 138 | 20 | 26.7 | 80 | 508 | 1,120 | 0 | 0 | 100 | 0 | 0 |
| 15 | V/L | 3,378 | 490 | 13.3 | 56 | 55 | 121 | 25.81 | 50.63 | 23.56 | 0 | 0 |
| 16 | V | 5,019 | 728 | 5.0 | 41 | 36,010 | 79,392 | 94.27 | 3.79 | 0.92 | | |
| 17 | V | 5,019 | 728 | 4.4 | 40 | 36,159 | 79,721 | 94.02 | 3.88 | 1.08 | 0.98 | 0.04 |
| 18 | V/L | 2,068 | 300 | 13.3 | 56 | 52,048 | 114,750 | 25.81 | 50.63 | 23.56 | 0 | 0 |
| 19 | L | 4,813 | 698 | −93.3 | −136 | 36,159 | 79,721 | 94.02 | 3.88 | 1.08 | 0.98 | 0.04 |
| 20 | L | 2,861 | 415 | −95.6 | −140 | 36,159 | 79,721 | 94.02 | 3.88 | 1.08 | 0.98 | 0.04 |
| 22 | V | 2,827 | 410 | −90.0 | −130 | 2,988 | 6,589 | 99.11 | 0.46 | 0.01 | 0.28 | 0.14 |
| 23 | L | 1,793 | 260 | −99.4 | −147 | 52,048 | 114,750 | 25.81 | 50.63 | 23.56 | 0 | 0 |
| 24 | V/L | 414 | 60 | −108.3 | −163 | 52,048 | 114,750 | 25.81 | 50.63 | 23.56 | 0 | 0 |
| 25 | V/L | 379 | 55 | −104.4 | −156 | 52,048 | 114,750 | 25.81 | 50.63 | 23.56 | 0 | 0 |
| 27 | V | 345 | 50 | 10.0 | 50 | 52,048 | 114,750 | 25.81 | 50.63 | 23.56 | 0 | 0 |
| 28 | L | 2,689 | 390 | −99.4 | −147 | 1,584 | 3,492 | 99.11 | 0.46 | 0.01 | 0.28 | 0.14 |
| 29 | L | 2,861 | 415 | −95.6 | −140 | 37,703 | 83,125 | 94.23 | 3.74 | 1.03 | 0.96 | 0.04 |
| 38 | V | 2,758 | 400 | 10.0 | 50 | 1,410 | 3,108 | 99.11 | 0.46 | 0.01 | 0.28 | 0.14 |

|  | Power hp | Power kW |
|---|---:|---:|
| Compressors | | |
| Compressor of Expander Process 30 | 2,300 | 1,715 |
| Compressors of MCR Refrigeration System 45 | | |
| Stage 1 | 75,000 | 55,928 |
| Stage 2 | 28,000 | 20,880 |
| Recompressor of Fractionation Plant 35 | 10 | 7 |
| Expanders | | |
| Expander of Expander Process 30 | −2,300 | −1,715 |
| Expander 34 | −1,050 | −783 |
| Pumps | | |
| Pump 36 | 10 | 7 |
| Pump of MCR Refrigeration System 45 | 480 | 358 |

TABLE 2-continued

|  |  |  |
|---|---:|---:|
| Product Pump of Fractionation Plant 35 | 20 | 15 |
| Net Power | 102,500 | 76,435 |
| Total Installed | 109,200 | 81,432 |

TABLE 3

| Stream | Phase Vapor/ Liquid | Pressure kPa | Pressure psia | Temperature °C. | Temperature °F. | Flow Rate kgmole/ hr | Flow Rate lbmole/ hr | Composition, mole % $C_1$ | $C_2$ | $C_{3+}$ | $CO_2$ | $N_2$ |
|---|---|---|---|---|---|---|---|---|---|---|---|---|
| 10 | V/L | 5,516 | 800 | 4.4 | 40 | 36,707 | 80,929 | 92.6 | 3.9 | 2.48 | 0.98 | 0.04 |
| 11 | V/L | 5,378 | 780 | −34.4 | −30 | 36,707 | 80,929 | 92.6 | 3.9 | 2.48 | 0.98 | 0.04 |
| 12 | L | 5,378 | 780 | 187.8 | 370 | 817 | 1,801 | 5.43 | 13.04 | 80.05 | 1.48 | 0 |
| 13 | V/L | 5,295 | 768 | 61.7 | 143 | 169 | 373 | 12.33 | 33.85 | 50.47 | 3.35 | 0 |
| 14 | L | 138 | 20 | 26.7 | 80 | 548 | 1,208 | 0 | 0 | 100 | 0 | 0 |
| 15 | V/L | 3,378 | 490 | 13.3 | 56 | 90 | 198 | 26.05 | 54.69 | 19.26 | 0 | 0 |
| 16 | V | 5,295 | 768 | −34.4 | −30 | 35,910 | 79,172 | 94.58 | 3.69 | 0.72 | 0.97 | 0.04 |
| 17 | V/L | 5,295 | 768 | −33.9 | −29 | 36,060 | 79,502 | 94.2 | 3.83 | 0.95 | 0.98 | 0.04 |
| 18 | V/L | 2,586 | 375 | −34.4 | −30 | 26,995 | 59,517 | 25 | 75 | 0 | 0 | 0 |
| 18a | V | 2,723 | 395 | 13.3 | 56 | 26,995 | 59,517 | 25 | 75 | 0 | 0 | 0 |
| 19 | L | 5,088 | 738 | −92.8 | −135 | 36,060 | 79,502 | 94.2 | 3.83 | 0.95 | 0.98 | 0.04 |
| 20 | L | 2,861 | 415 | −95.6 | −140 | 36,060 | 79,502 | 94.2 | 3.83 | 0.95 | 0.98 | 0.04 |
| 22 | V | 2,827 | 410 | −90.0 | −130 | 2988 | 6,589 | 99.11 | 0.46 | 0.01 | 0.28 | 0.14 |
| 23 | L | 2,310 | 335 | −99.4 | −147 | 26,995 | 59,517 | 25 | 75 | 0 | 0 | 0 |
| 24 | V/L | 414 | 60 | −107.8 | −162 | 26,995 | 59,517 | 25 | 75 | 0 | 0 | 0 |
| 25 | V/L | 379 | 55 | −103.3 | −154 | 26,995 | 59,517 | 25 | 75 | 0 | 0 | 0 |
| 27 | V | 345 | 50 | −35.6 | −32 | 26,995 | 59,517 | 25 | 75 | 0 | 0 | 0 |
| 27a | V | 276 | 40 | 7.8 | 46 | 26,995 | 59,517 | 25 | 75 | 0 | 0 | 0 |
| 28 | L | 2,689 | 390 | −99.4 | −147 | 1429 | 3,152 | 99.11 | 0.46 | 0.01 | 028 | 0.14 |
| 29 | L | 2,861 | 415 | −95.6 | −140 | 37,504 | 82,686 | 94.38 | 3.7 | 0.93 | 0.95 | 0.04 |
| 38 | V | 2,758 | 400 | −35.6 | −32 | 1,559 | 3,437 | 99.11 | 0.46 | 0.01 | 0.28 | 0.14 |

|  | Power hp | Power kW |
|---|---:|---:|
| Compressors | | |
| Compressor of Refrigeration System 40 | | |
| Stage 1 | 14,600 | 10,887 |
| Stage 2 | 29,700 | 22,148 |
| Compressors of MCR Refrigeration System 45 | | |
| Stage 1 | 52,700 | 39,299 |
| Stage 2 | 21,100 | 15,735 |
| Recompressor of Fractionation Plant 35 | 20 | 15 |
| Expander | | |
| Expander 34 | −1,200 | −895 |
| Pumps | | |
| Pump 36 | 10 | 7 |
| Product Pump of Fractionation Plant 35 | 25 | 19 |
| Net Power | 117,000 | 87,248 |
| Total Installed | 119,400 | 89,038 |

TABLE 4

| Stream | Phase Vapor/ Liquid | Pressure kPa | Pressure psia | Temperature °C. | Temperature °F. | Flow Rate kgmole/ hr | Flow Rate lbmole/ hr | Composition, mole % $C_1$ | $C_2$ | $C_{3+}$ | $CO_2$ | $N_2$ |
|---|---|---|---|---|---|---|---|---|---|---|---|---|
| 10 | V/L | 5,585 | 810 | 21.1 | 70 | 36,707 | 80,929 | 92.6 | 3.9 | 2.48 | 0.98 | 0.04 |
| 11 | V/L | 5,516 | 800 | 4.4 | 40 | 36,707 | 80,929 | 92.6 | 3.9 | 2.48 | 0.98 | 0.04 |

TABLE 4-continued

| Stream | Phase Vapor/Liquid | Pressure kPa | Pressure psia | Temperature °C | Temperature °F | Flow Rate kgmole/hr | Flow Rate lbmole/hr | $C_1$ | $C_2$ | $C_{3+}$ | $CO_2$ | $N_2$ |
|---|---|---|---|---|---|---|---|---|---|---|---|---|
| 11a | V/L | 5,378 | 780 | -34.4 | -30 | 36,707 | 80,929 | 92.6 | 3.9 | 2.48 | 0.98 | 0.04 |
| 12 | L | 5,378 | 780 | 187.8 | 370 | 817 | 1,801 | 5.43 | 13.04 | 80.05 | 1.48 | 0 |
| 13 | V/L | 5,295 | 768 | 61.7 | 143 | 169 | 373 | 12.33 | 33.85 | 50.47 | 3.35 | 0 |
| 14 | L | 138 | 20 | 26.7 | 80 | 548 | 1,208 | 0 | 0 | 100 | 0 | 0 |
| 15 | V/L | 3,378 | 490 | 13.3 | 56 | 90 | 198 | 26.05 | 54.69 | 19.26 | 0 | 0 |
| 16 | V | 5,295 | 768 | -34.4 | -30 | 35,910 | 79,172 | 94.58 | 3.69 | 0.72 | 0.97 | 0.04 |
| 18 | V/L | 2,758 | 400 | 13.3 | 56 | 43,331 | 95,534 | 26.25 | 50.5 | 23.25 | 0 | 0 |
| 19 | L | 5,088 | 738 | -92.8 | -135 | 36,060 | 79,502 | 94.2 | 3.83 | 0.95 | 0.98 | 0.04 |
| 20 | L | 2,861 | 415 | -95.6 | -140 | 36,060 | 79,502 | 94.2 | 3.83 | 0.95 | 0.98 | 0.04 |
| 22 | V | 2,827 | 410 | -90.0 | -130 | 2,988 | 6,589 | 99.11 | 0.46 | 0.01 | 0.28 | 0.14 |
| 23 | L | 2,275 | 330 | -99.4 | -147 | 43,331 | 95,534 | 26.25 | 50.5 | 23.25 | 0 | 0 |
| 24 | V/L | 414 | 60 | -108.3 | -163 | 43,331 | 95,534 | 26.25 | 50.5 | 23.25 | 0 | 0 |
| 25 | V/L | 379 | 55 | -104.4 | -156 | 43,331 | 95,534 | 26.25 | 50.5 | 23.25 | 0 | 0 |
| 27 | V | 310 | 45 | 11.7 | 53 | 43,331 | 95,534 | 26.25 | 50.5 | 23.25 | 0 | 0 |
| 28 | L | 2,689 | 390 | -99.4 | -147 | 1,584 | 3,492 | 99.11 | 0.46 | 0.01 | 0.28 | 0.14 |
| 29 | L | 2,861 | 415 | -95.6 | -140 | 37,654 | 83,016 | 94.4 | 3.69 | 0.92 | 0.95 | 0.04 |
| 38 | V | 2,758 | 400 | -41.1 | -42 | 1,405 | 3,097 | 99.11 | 0.46 | 0.01 | 0.28 | 0.14 |

| | Power hp | Power kW |
|---|---|---|
| Compressors | | |
| Compressor of Refrigeration System 45 | | |
| Stage 1 | 70,500 | 52573 |
| Stage 2 | 31,900 | 23,788 |
| Recompressor of Fractionation Plant 35 | 20 | 15 |
| Expander Expander 34 | -1,200 | -895 |
| Pumps | | |
| Pump 36 | 10 | 7 |
| Pump of MCR Refrigeration System 45 | 670 | 500 |
| Product Pump of Fractionation Plant 35 | 25 | 19 |
| Net Power | 101,900 | 75,988 |
| Total Installed | 104,300 | 77,778 |

TABLE 5

| Stream | Phase Vapor/Liquid | Pressure kPa | Pressure psia | Temperature °C | Temperature °F | Flow Rate kgmole/hr | Flow Rate lbmole/hr | $C_1$ | $C_2$ | $C_{3+}$ | $CO_2$ | $N_2$ |
|---|---|---|---|---|---|---|---|---|---|---|---|---|
| 10 | V/L | 5,585 | 810 | 21.1 | 70 | 36,707 | 80,929 | 92.6 | 3.9 | 2.48 | 0.98 | 0.04 |
| 11 | V/L | 5,516 | 800 | 4.4 | 40 | 36,707 | 80,929 | 92.6 | 3.9 | 2.48 | 0.98 | 0.04 |
| 12 | L | 4,757 | 690 | 206.7 | 404 | 682 | 1,504 | 3.97 | 9.54 | 85.44 | 1.05 | 0 |
| 13 | V/L | 5,019 | 728 | 62.2 | 144 | 115 | 253 | 11.21 | 32.57 | 53.25 | 2.97 | 0 |
| 14 | L | 138 | 20 | 26.7 | 80 | 508 | 1,120 | 0 | 0 | 100 | 0 | 0 |
| 15 | V/L | 3,378 | 490 | 13.3 | 56 | 55 | 121 | 25.81 | 50.63 | 23.56 | 0 | 0 |
| 16 | V | 5,019 | 728 | 5.0 | 41 | 36,010 | 79,392 | 94.27 | 3.79 | 0.92 | 0.98 | 0.04 |
| 17 | V | 5,019 | 728 | 4.4 | 40 | 36,159 | 79,721 | 94.02 | 3.88 | 1.08 | 0.98 | 0.04 |
| 18 | L | 2,068 | 300 | 17.8 | 64 | 18,827 | 41,508 | 4.81 | 37.97 | 57.22 | 0 | 0 |
| 19 | L | 4,813 | 698 | -93.3 | -136 | 36,159 | 79,721 | 94.02 | 3.88 | 1.08 | 0.98 | 0.04 |
| 20 | L | 2,861 | 415 | -95.6 | -140 | 36,159 | 79,721 | 94.02 | 3.88 | 1.08 | 0.98 | 0.04 |
| 21 | V | 2,068 | 300 | 17.8 | 64 | 40,343 | 88,945 | 33.69 | 57.67 | 8.64 | 0 | 0 |
| 22 | V | 2,827 | 410 | -90.0 | -130 | 2,988 | 6,589 | 99.11 | 0.46 | 0.01 | 0.28 | 0.14 |
| 23 | L | 1,793 | 260 | -99.4 | -147 | 40,343 | 88,945 | 33.69 | 57.67 | 8.64 | 0 | 0 |
| 24 | V/L | 414 | 60 | -113.9 | -173 | 40,343 | 88,945 | 33.69 | 57.67 | 8.64 | 0 | 0 |
| 25 | V/L | 379 | 55 | -110.6 | -167 | 40,343 | 88,945 | 33.69 | 57.67 | 8.64 | 0 | 0 |
| 27 | V | 345 | 50 | 9.4 | 49 | 59,170 | 130,453 | 24.5 | 51.4 | 24.1 | 0 | 0 |
| 28 | L | 2,689 | 390 | -99.4 | -147 | 1,434 | 3,163 | 99.11 | 0.46 | 0.01 | 0.28 | 0.14 |
| 29 | L | 2,861 | 415 | -95.6 | -140 | 37,554 | 82,796 | 94.21 | 3.75 | 1.04 | 0.96 | |
| 38 | V | 2,758 | 400 | 9.4 | 49 | 1,559 | 3,437 | 99.11 | 0.46 | 0.01 | 0.28 | 0.14 |

TABLE 5-continued

|  | Power hp | Power kW |
|---|---|---|
| Compressors | | |
| Compressor of Expander Process 30 | 2,300 | 0 |
| Compressors of MCR Refrigeration System 45 | | |
| Stage 1 | 84,900 | 63,311 |
| Stage 2 | 31,800 | 23,714 |
| Recompressor of Fractionation Plant 35 | 10 | 7 |
| Expanders | | 2 |
| Expander of Expander Process 30 | −2,300 | −1,715 |
| Expander 34 | −1,050 | −783 |
| Pumps | | 0 |
| Pump 36 | 10 | 7 |
| Pump of MCR Refrigeration System 45 | 500 | 373 |
| Product Pump of Fractionation Plant 35 | 20 | 15 |
| Net Power | 116,200 | 86,652 |
| Total Installed | 122,900 | 91,648 |

TABLE 6

| Stream | Phase Vapor/ Liquid | Pressure kPa | Pressure psia | Temperature °C. | Temperature °F. | Flow Rate kgmole/ hr | Flow Rate lbmole/ hr | Composition, mole % $C_1$ | $C_2$ | $C_{3+}$ | $CO_2$ | $N_2$ |
|---|---|---|---|---|---|---|---|---|---|---|---|---|
| 10 | V/L | 5,585 | 810 | 21.1 | 70 | 36,707 | 80,929 | 92.6 | 3.9 | 2.48 | 0.98 | 0.04 |
| 11 | V/L | 5,516 | 800 | 4.4 | 40 | 36,707 | 80,929 | 92.6 | 3.9 | 2.48 | 0.98 | 0.04 |
| 12 | L | 4,757 | 690 | 206.7 | 404 | 682 | 1,504 | 3.97 | 9.54 | 85.44 | 1.05 | 0 |
| 13 | V/L | 5,019 | 728 | 62.2 | 144 | 115 | 253 | 11.21 | 32.57 | 53.25 | 2.97 | 0 |
| 14 | L | 138 | 20 | 26.7 | 80 | 508 | 1,120 | 0 | 0 | 100 | 0 | 0 |
| 15 | V/L | 3,378 | 490 | 13.3 | 56 | 55 | 121 | 25.81 | 50.63 | 23.56 | 0 | 0 |
| 16 | V | 5,019 | 728 | 5.0 | 41 | 36,010 | 79,392 | 94.27 | 3.79 | 0.92 | 0.98 | 0.04 |
| 17 | V | 5,019 | 728 | 6.7 | 44 | 37,753 | 83,235 | 94.23 | 3.74 | 1.04 | 0.95 | 0.04 |
| 18 | V/L | 2,068 | 300 | 13.3 | 56 | 53,343 | 117,606 | 26 | 50 | 24 | 0 | 0 |
| 19 | L | 4,813 | 698 | −93.3 | −136 | 37,753 | 83,235 | 94.23 | 3.74 | 1.04 | 0.95 | 0.04 |
| 20 | L | 2,861 | 415 | −95.6 | −140 | 37,753 | 83,235 | 94.23 | 3.74 | 1.04 | 0.95 | 0.04 |
| 22 | V | 2,827 | 410 | −90.0 | −130 | 2,988 | 6,589 | 99.11 | 0.46 | 0.01 | 0.28 | 0.14 |
| 23 | L | 1,862 | 270 | −93.3 | −136 | 53,343 | 117,606 | 26 | 50 | 24 | 0 | 0 |
| 24 | V/L | 414 | 60 | −105.0 | −157 | 53,343 | 117,606 | 26 | 50 | 24 | 0 | 0 |
| 27 | V | 379 | 55 | 8.9 | 48 | 53,343 | 117,606 | 26 | 50 | 24 | 0 | 0 |
| 32 | V | 5,019 | 728 | 62.8 | 145 | 1,609 | 3,547 | 99.11 | 0.46 | 0.01 | 0.28 | 0.14 |
| 38 | V | 2,758 | 400 | 8.9 | 48 | 1,380 | 3,042 | 99.11 | 0.46 | 0.01 | 0.28 | 0.14 |

|  | Power hp | Power kW |
|---|---|---|
| Compressors | | |
| Compressor of Expander Process 30 | 2,300 | 1,715 |
| Compressors of MCR Refrigeration System 45 | | |
| Stage 1 | 73,900 | 55,107 |
| Stage 2 | 25,100 | 18,717 |
| Recompressor of Fractionation Plant 35 | 10 | 7 |
| Compressor 39 | 1,100 | 820 |
| Expanders | | |
| Expander of Expander Process 30 | −2,300 | −1,715 |

TABLE 6-continued

|  | Power hp | Power kW |
|---|---|---|
| Expander 34 | −1,100 | −820 |
| Pumps | | |
| Pump of MCR Refrigeration System 45 | 480 | 358 |
| Product Pump of Fractionation Plant 35 | 20 | 15 |
| Net Power | 99,500 | 74,197 |
| Total Installed | 106,300 | 79,218 |

TABLE 7

| Stream | Phase Vapor/Liquid | Pressure kPa | Pressure psia | Temperature °C. | Temperature °F. | Flow Rate kgmole/hr | Flow Rate lbmole/hr | Composition, mole % C₁ | C₂ | C₃₊ | CO₂ | N₂ |
|---|---|---|---|---|---|---|---|---|---|---|---|---|
| 10 | V/L | 5,585 | 810 | 21.1 | 70 | 36,707 | 80,929 | 92.6 | 3.9 | 2.48 | 0.98 | 0.04 |
| 11 | V/L | 5,516 | 800 | 4.4 | 40 | 36,707 | 80,929 | 92.6 | 3.9 | 2.48 | 0.98 | 0.04 |
| 12 | L | 4,757 | 690 | 206.7 | 404 | 682 | 1,504 | 3.97 | 9.54 | 85.44 | 1.05 | 0 |
| 13 | V/L | 5,019 | 728 | 62.2 | 144 | 115 | 253 | 11.21 | 32.57 | 53.25 | 2.97 | 0 |
| 14 | L | 138 | 20 | 26.7 | 80 | 508 | 1,120 | 0 | 0 | 100 | 0 | 0 |
| 15 | V/L | 3,378 | 490 | 13.3 | 56 | 55 | 121 | 25.81 | 50.63 | 23.56 | 0 | 0 |
| 16 | V | 5,019 | 728 | 5.0 | 41 | 36,010 | 79,392 | 94.27 | 3.79 | 0.92 | 0.98 | 0.04 |
| 17 | V | 5,019 | 728 | 2.2 | 36 | 37,604 | 82,906 | 94.22 | 3.75 | 1.03 | 0.98 | 0.04 |
| 18 | L | 2,689 | 390 | 19.4 | 67 | 19,673 | 43,375 | 6.66 | 45.52 | 47.82 | 0 | 0 |
| 19 | L | 4,606 | 668 | −93.3 | −136 | 37,604 | 82,906 | 94.22 | 3.75 | 1.03 | 0.96 | 0.04 |
| 20 | L | 2,861 | 415 | −95.6 | −140 | 37,604 | 82,906 | 94.22 | 3.75 | 1.03 | .096 | 0.04 |
| 21 | V | 2,689 | 390 | 19.4 | 67 | 32,773 | 72,254 | 35.21 | 57.81 | 6.98 | 0.0 | 0 |
| 22 | V | 2,827 | 410 | −90.0 | −130 | 2,988 | 6,589 | 99.11 | 0.46 | 0.01 | 0.28 | 0.14 |
| 23 | L | 2,275 | 330 | −93.3 | −136 | 32,773 | 72,254 | 35.21 | 57.81 | 6.98 | 0 | 0 |
| 24 | V/L | 483 | 70 | −109.4 | −165 | 32,773 | 72,254 | 35.21 | 57.81 | 6.98 | 0 | 0 |
| 25 | V/L | 414 | 60 | −51.1 | −60 | 32,773 | 72,254 | 35.21 | 57.81 | 6.98 | 0 | 0 |
| 26 | V/L | 2,482 | 360 | −45.6 | −50 | 32,773 | 72,254 | 35.21 | 57.81 | 6.98 | 0 | 0 |
| 27 | V | 379 | 55 | 12.8 | 55 | 52,446 | 115,629 | 24.5 | 53.2 | 22.3 | 0 | 0 |
| 32 | V | 5,033 | 730 | −53.3 | −64 | 1,484 | 3,272 | 99.11 | 0.46 | 0.01 | 0.28 | 0.14 |
| 38 | V | 2,723 | 395 | 12.8 | 55 | 1,509 | 3,327 | 99.11 | 0.46 | 0.01 | 0.28 | 0.14 |
| 41 | L | 2,482 | 360 | −45.6 | −50 | 19,673 | 43,375 | 6.66 | 45.52 | 47.82 | 0 | 0 |
| 42 | V/L | 414 | 60 | −54.4 | −66 | 19,673 | 43,375 | 6.66 | 45.52 | 47.82 | 0 | 0 |
| 43 | V/L | 414 | 60 | −51.1 | −60 | 52,446 | 115,629 | 24.5 | 53.2 | 22.3 | 0 | 0 |

|  | Power hp | Power kW |
|---|---|---|
| Compressors | | |
| Compressor of Expander Process 30 | 2,300 | 1,715 |
| Compressors of MCR Refrigeration System 45 | | |
| Stage 1 | 80,000 | 59,656 |
| Stage 2 | 31500 | 23,490 |
| Recompressor of Fractionation Plant 35 | 10 | 7 |
| Compressor 39 | 450 | 3.36 |
| Expanders | | |
| Expander of Expander Process 30 | −2,300 | −1,715 |
| Expander 34 | −980 | −731 |
| Pumps | | |
| Pump of MCR Refrigeration System 45 | 690 | 515 |
| Product Pump of Fractionation Plant 35 | 20 | 15 |
| Net Power | 111,700 | 83,295 |
| Total Installed | 118,300 | 88,216 |

What is claimed is:

1. A process for liquefying a pressurized gas stream rich in methane which comprises the steps of liquefying the gas stream in a heat exchanger being cooled by a closed-loop multi-component refrigeration system to produce a methane-rich liquid product having a temperature above about −112° C. (−170° F.) and a pressure sufficient for the liquid product to be at or below its bubble point, and introducing the liquid product to a storage means at a temperature above about −112° C. (−170° F.).

2. The process of claim 1 further comprising reducing the pressure of the liquid product by an expander means prior to introducing the liquid product to the storage means, said expander means producing a liquid stream at a temperature above about −112° C. (−170° F.) and at a pressure sufficient for the liquid product to be at or below its bubble point.

3. The process of claim 1 further comprises passing to said heat exchanger a boil-off gas resulting from evaporation of liquefied natural gas, the boil-off gas being at least partially liquefied by the heat exchanger, and pressurizing the liquefied boil-off gas, said pressurized boil-off gas having a temperature above about −112° C. (−170° F.) and a pressure sufficient for the liquid product to be at or below its bubble point.

4. The process of claim 3 wherein the heat exchanger comprises a first cooling zone and a second cooling zone operating at a lower temperature than the first cooling zone, passing the gas stream of claim 1 to the first cooling zone for liquefaction and passing the boil-off gas to the second cooling zone for liquefaction.

5. The process of claim 4 further comprising withdrawing a portion of the boil-off gas before the boil-off gas passes to the heat exchanger and passing the withdrawn portion of the boil-off gas to the first cooling zone to warm the withdrawn boil-off gas and to cool the gas stream in the heat exchanger and using the warmed withdrawn boil-off gas as fuel.

6. The process of claim 1 further comprises compressing a boil-off gas resulting from evaporation of liquefied natural gas to a pressure approximating the pressure of the gas stream being fed to the heat exchanger and combining the compressed boil-off gas with the gas stream prior to gas stream being passed to the heat exchanger.

7. The process of claim 1 further comprises passing a boil-off gas resulting from evaporation of liquefied natural gas to the heat exchanger to cool the boil-off gas, compressing the boil-off gas, and combining the compressed boil-off gas with the gas stream, and passing the combined boil-off gas and the gas stream to the heat exchanger for liquefaction.

8. The process of claim 7 further comprising, after passing boil-off gas through the heat exchanger and before compressing the cooled boil-off gas, withdrawing a portion of the boil-off gas and using the withdrawn portion as fuel.

9. The process of claim 3, wherein the heat exchanger comprises a first cooling zone, a second cooling zone, and a third cooling zone, said second cooling zone operating at a temperature below the temperature of the first cooling zone and above the temperature of the third cooling zone, further comprising the steps of passing the boil-off gas to the third cooling zone to liquefy the boil-off gas, withdrawing a portion of the boil-off gas before being passed through the third cooling zone and passing the withdrawn boil-off gas through the second cooling zone to warm the withdrawn boil-off gas and using the warmed withdrawn boil-off gas as fuel.

10. The process of claim 1 wherein the gas stream contains methane and hydrocarbon components heavier than methane, which further comprises removing a predominant portion of the heavier hydrocarbons by fractionation to produce a vapor stream rich in methane and a liquid stream rich in the heavier hydrocarbons, the vapor stream then being liquefied by the heat exchanger.

11. The process of claim 10 wherein the liquid stream rich in the heavier hydrocarbons is further fractionated producing vapor rich in ethane which is combined with the methane-rich stream of claim 7.

12. The process of claim 10 which further comprises cooling the feed stream prior to fractionation of the feed stream.

13. The process of claim 1 wherein the heat exchanger comprises a first cooling zone and a second cooling zone, said first cooling zone being cooled by passing a multi-component liquid refrigerant through the first cooling zone to cool the liquid refrigerant, passing the liquid refrigerant through a pressure expansion means to further lower the temperature of the liquid refrigerant and passing the refrigerant from the expansion means through the first cooling zone, passing a multi-component vapor refrigerant through the first cooling and the second cooling zone to lower its temperature, passing the cooled vapor refrigerant through an expansion means, passing the expanded refrigerant through the second cooling zone and then through the first cooling zone, and liquefying the gas stream by passing the gas stream through the first cooling zone and the second cooling zone to produce a liquid product having a temperature above about −112° C. (−170° F.) and a pressure sufficient for the liquid product to be at or below its bubble point.

14. A process of claim 1 wherein the process further comprises:

(a) cooling the gas stream to effect the partial liquefaction of the gas stream;

(b) separating the partially condensed gas stream into a liquid rich in hydrocarbons heavier than methane and vapor stream rich in methane;

(c) fractionating the liquefied part in at least one fractionation column to produce a vapor stream rich in ethane and a liquid stream rich in hydrocarbons heavier than ethane and removing the liquid stream from the process;

(d) combining the vapor stream rich in methane and the vapor stream rich in ethane and passing the combined stream to the heat exchanger of claim 1, whereby the combined stream is liquefied; and (e) prior to introducing the combined liquid stream to the storage means, expanding at least a portion of the subcooled liquid to produce a liquid product having a temperature above about −112° C. (−170° F.) and a pressure sufficient for the liquid product to be at or below its bubble point.

15. The process of claim 14 wherein the cooling of the natural gas stream in step (a) is at least partially provided by a closed-loop propane refrigeration system.

16. A process according to claim 14 wherein the process further comprises passing to the heat exchanger boil-off vapors resulting from the evaporation of a liquefied natural gas to produce a second liquefied natural gas stream having a temperature above about −112° C. (−170° F.) and a pressure sufficient for the liquid product to be at or below its bubble point, and combining the second liquefied natural gas stream with the expanded liquefied gas of step (e) of claim 14.

17. The process of claim 14 wherein the heat exchanger of step (d) comprises a first cooling zone and a second cooling zone operating at a lower temperature than the first cooling zone, wherein the methane-rich streams of step (b) and step (c) of claim 14 are passed to the first cooling zone and boil-off vapors resulting from evaporation of a liquefied natural gas having a temperature above about −112° C. (−170° F.) is passed to the second cooling zone for liquefaction.

18. The process of claim 10 wherein the gas stream enters the process at an elevated temperature ranging from about 0C. to about 50° C. and at the elevated pressure ranging from about 2758 kPa (400 psia) to about 8274 kPa (1200 psia) and the liquefied product produced by the process is at a pressure greater than about 1724 kPa (250 psia) and a temperature above about −112° C. (−170° F.).

19. The process of claim 1 wherein the multi-component refrigeration system has a refrigerant comprising methane, ethane, propane, butane, pentane, carbon dioxide, hydrogen sulfide, and nitrogen.

20. A process for liquefying a natural gas stream comprising methane, propane, and heavier hydrocarbons to produce liquefied natural gas having a pressure higher than about 1724 kPa (250 psia) and a temperature above about −112 ° C. (−170° F.), which process comprises:

(a) passing the natural gas stream to the first cooling zone of a multi-component heat exchanger, the multi-component heat exchanger comprising three cooling zones, with the second cooling zone operating at a temperature below the temperature of the first cooling zone and above the temperature of the third cooling zone;

(b) fractionating the cooled natural gas feed stream to separate a methane-rich stream from heavier hydrocarbons stream;

(c) fractionating the heavier hydrocarbons stream to produce a ethane-rich stream and a stream containing hydrocarbons heavier than ethane and removing the hydrocarbons heavier than ethane from the process;

(d) combining the methane-rich stream of step (b) and the ethane-rich stream of step (c) and passing the combined stream to the second cooling zone of the multi-component refrigeration system and cooling the combined stream to produce a subcooled condensate;

(e) expanding at least a portion of the subcooled condensate to provide liquefied natural gas having a pressure higher than about 1724 kPa (250 psia) and a temperature above about −112° C. (−170° F.); and (f) passing to the third cooling zone of the multi-component refrigeration system gas resulting from the evaporation of a liquefied natural gas contained in a storage vessel to produce a second liquefied natural gas stream and combining the second liquefied natural gas stream with the liquefied natural gas produced in step (e).

21. A process for liquefying a natural gas stream comprising methane, propane, and heavier hydrocarbons to produce liquefied natural gas having a pressure higher than about 1724 kPa (250 psia) and a temperature above about −112 ° C. (−170° F.), which process comprises:

(a) cooling the natural gas stream by a propane refrigeration system;

(b) fractionating the cooled natural gas stream to separate a methane-rich stream and heavier hydrocarbons stream;

(c) fractionating the heavier hydrocarbons stream to produce a ethane-rich stream and at least one stream containing hydrocarbons heavier than ethane and removing the hydrocarbons heavier than ethane from the process;

(d) combining the methane-rich stream of step (b) and the ethane-rich stream of step (c) and passing the combined stream to the first cooling zone of a multi-component refrigeration system having a first cooling zone refrigerated by a multi-component liquid and a multi-component vapor in heat exchange relationship with the combined methane-rich stream and the ethane-rich stream to produce a subcooled condensate; and (e) expanding at least a portion of the subcooled condensate to provide liquefied natural gas having a pressure higher than about 1724 kPa (250 psia) and a temperature above about −112 ° C. (−170° F.).

(f) passing to the second cooling zone of the multi-component refrigeration system gas resulting from the evaporation of a liquefied natural gas contained in a storage vessel to produce a second liquefied natural gas stream and combining the second liquefied natural gas stream with the liquefied natural gas produced in step (e).

* * * * *